(12) United States Patent
Morin et al.

(10) Patent No.: US 11,799,087 B2
(45) Date of Patent: Oct. 24, 2023

(54) BATTERY CONNECTIONS AND METALLIZED FILM COMPONENTS IN ENERGY STORAGE DEVICES HAVING INTERNAL FUSES

(71) Applicant: Soteria Battery Innovation Group, Inc., Greenville, SC (US)

(72) Inventors: Brian G. Morin, Greenville, SC (US); Carl C. Hu, Taylors, SC (US)

(73) Assignee: Soteria Battery Innovation Group, Inc., Greenville, SC (US)

( * ) Notice: Subject to any disclaimer, the term of this patent is extended or adjusted under 35 U.S.C. 154(b) by 0 days.

(21) Appl. No.: 17/495,813

(22) Filed: Oct. 6, 2021

(65) Prior Publication Data
US 2022/0311013 A1    Sep. 29, 2022

Related U.S. Application Data

(60) Division of application No. 16/732,139, filed on Dec. 31, 2019, now Pat. No. 11,158,860, which is a
(Continued)

(51) Int. Cl.
| | |
|---|---|
| *H01M 10/00* | (2006.01) |
| *H01M 4/66* | (2006.01) |
| *H01M 10/04* | (2006.01) |
| *H01M 4/70* | (2006.01) |
| *H01M 50/581* | (2021.01) |

(Continued)

(52) U.S. Cl.
CPC .......... *H01M 4/668* (2013.01); *H01M 4/661* (2013.01); *H01M 4/667* (2013.01); *H01M 4/70* (2013.01); *H01M 10/049* (2013.01); *H01M 50/534* (2021.01); *H01M 50/581* (2021.01); *H01M 50/583* (2021.01); *H01M 50/536* (2021.01);
(Continued)

(58) Field of Classification Search
CPC ...... H01M 4/668; H01M 4/667; H01M 4/661; H01M 4/70; H01M 50/534; H01M 50/581; H01M 50/583; H01M 50/538; H01M 50/54; H01M 50/536; H01M 10/0525; H01M 10/052; H01M 10/70; H01M 2200/103
See application file for complete search history.

(56) References Cited

U.S. PATENT DOCUMENTS

| | | | | |
|---|---|---|---|---|
| 2004/0137326 | A1* | 7/2004 | Munshi | H01M 4/00 429/231.5 |
| 2014/0322600 | A1* | 10/2014 | Morita | H01M 50/491 429/212 |
| 2018/0123177 | A1* | 5/2018 | Wang | H01M 10/441 |

* cited by examiner

*Primary Examiner* — Raymond Alejandro
(74) *Attorney, Agent, or Firm* — William S. Parks

(57) ABSTRACT

A lithium battery cell with an internal fuse component and including needed tabs which allow for conductance from the internal portion thereof externally to power a subject device is provided. Disclosed herein are tabs that exhibit sufficient safety levels in combination with the internal fuse characteristics noted above while simultaneously displaying pull strength to remain in place during utilization as well as complete coverage with the thin film metallized current collectors for such an electrical conductivity result. Such tabs are further provided with effective welds for the necessary contacts and at levels that exhibit surprising levels of amperage and temperature resistance to achieve the basic internal fuse result with the aforementioned sufficient conductance to an external device. With such a tab lead component and welded structure, a further improvement within the lithium battery art is provided the industry.

15 Claims, 34 Drawing Sheets

Related U.S. Application Data continuation-in-part of application No. 16/361,216, filed on Mar. 22, 2019, now Pat. No. 11,139,510, which is a continuation-in-part of application No. 15/927,075, filed on Mar. 20, 2018, now Pat. No. 10,763,481, which is a continuation-in-part of application No. 15/700,077, filed on Sep. 9, 2017, now Pat. No. 10,854,868.

(51) Int. Cl.
    *H01M 50/583*     (2021.01)
    *H01M 50/534*     (2021.01)
    *H01M 50/54*     (2021.01)
    *H01M 50/538*     (2021.01)
    *H01M 50/536*     (2021.01)

(52) U.S. Cl.
    CPC .......... *H01M 50/538* (2021.01); *H01M 50/54* (2021.01); *H01M 2200/103* (2013.01)

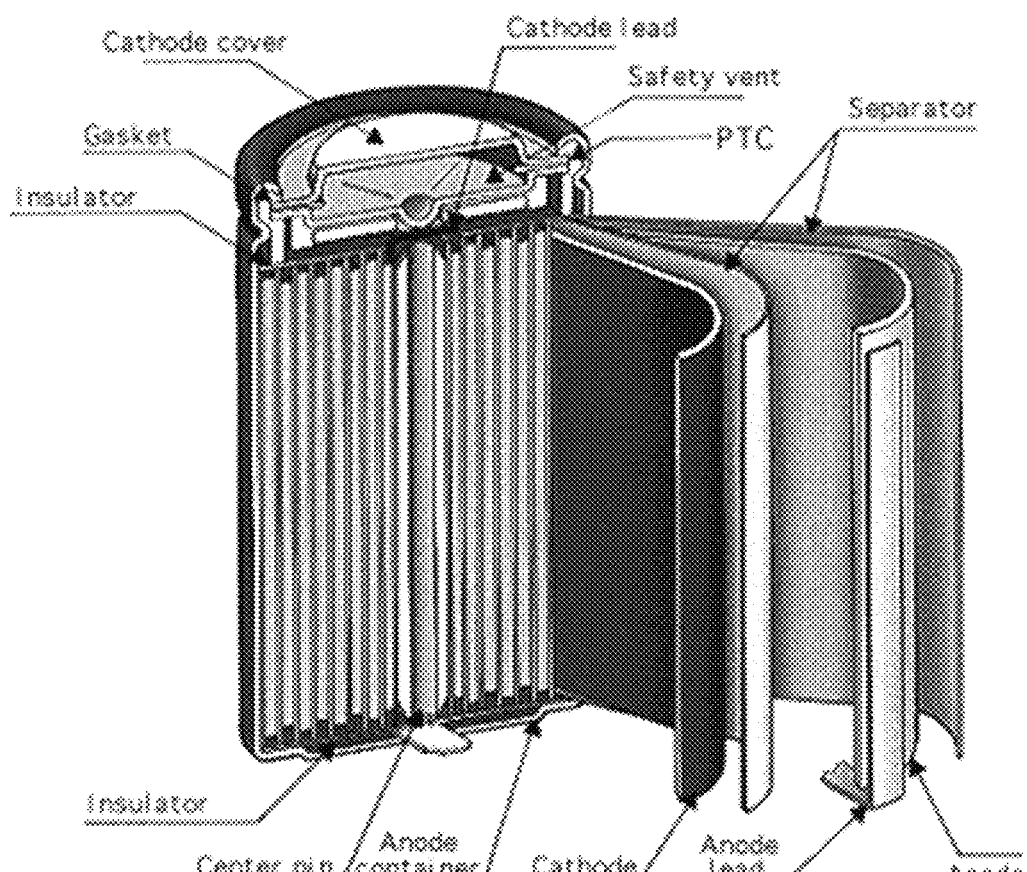
Fig. 1 – Wound Cell
Prior Art

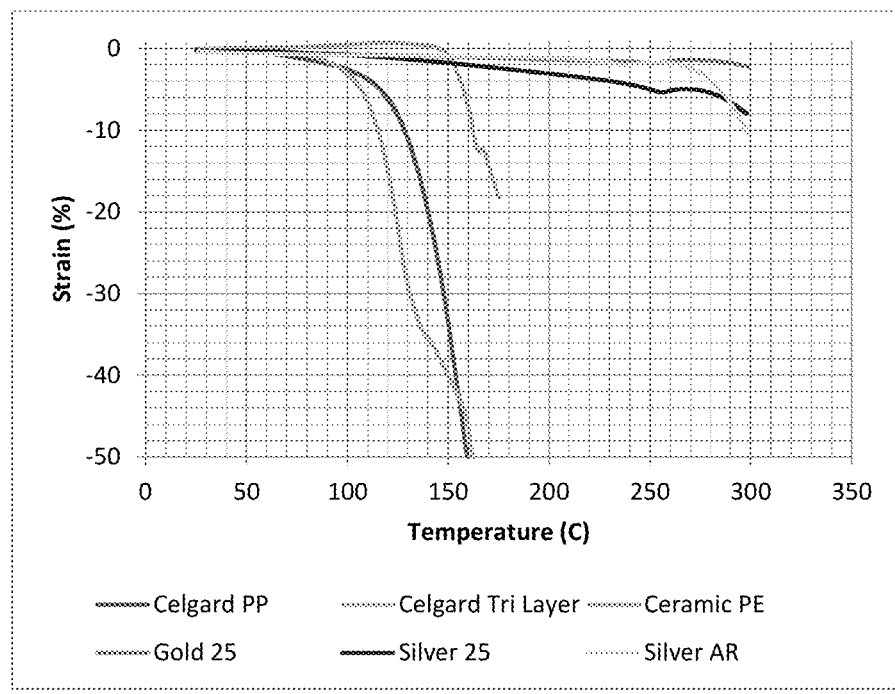
Fig. 2 - Separator Shrinkage
Prior Art

SEM of cross section of nail-penetrated cell
Prior Art

Zoom in of SEM of cross section of nail penetrated cell Aluminum current collector.
Prior Art Figure 5: An oxidizing metal at very low total metal thickness Traditional current Collector     Prior Art Thick conductive oxidative layer Inventive current Collector Thin conductive oxidative layer Non-conductive layer Thin conductive oxidative layer Figures 6A-6B: Images of Comparative Examples 1-2

Comparative Example 1 after touching with hot soldering iron
Prior Art

Comparative example 2 after touching with hot soldering iron
Prior Art

Fig. 7A- 7C: Images of Examples 1-3

Example 1 after touching with hot soldering iron

Example 2 after touching with hot soldering iron

Example 3 after touching with hot soldering iron

Fig. 8A – 8C: Images of Examples 4-6

Example 4 after touching with hot soldering iron

Example 5 after touching with hot soldering iron

Example 6 after touching with hot soldering iron

Comparative Example 3 after shorting at 4.0V
Prior Art

Comparative Example 4 after shorting at 4.0V
Prior Art

Example 14 after shorting at 4.0V

Closeup of welded layer (thin light line) to tab (bottom half light area). Note that the speckled dark area above the welded layer is epoxy used to stabilize joint for sectioning and viewing (specks are metallic debris from sectioning).

BATTERY CONNECTIONS AND METALLIZED FILM COMPONENTS IN ENERGY STORAGE DEVICES HAVING INTERNAL FUSES

CROSS-REFERENCE TO RELATED APPLICATIONS

This application is a divisional of pending U.S. patent application Ser. No. 16/732,139, filed on Dec. 31, 2019, which is a continuation-in-part of pending U.S. patent application Ser. No. 16/361,216, filed on Mar. 22, 2019, now U.S. Pat. No. 11,139,510, which is a continuation-in-part of U.S. patent application Ser. No. 15/927,075, filed on Mar. 28, 2018, now U.S. Pat. No. 10,763,481, which is a continuation-in-part of U.S. patent application Ser. No. 15/700,077, filed on Sep. 9, 2017, now U.S. Pat. No. 10,854,868, the entirety of all three applications herein being incorporated by reference.

FIELD OF THE INVENTION

The present disclosure relates to improvements in the structural components and physical characteristics of lithium battery articles. Standard lithium ion batteries, for example, are prone to certain phenomena related to short circuiting and have experienced high temperature occurrences and ultimate firing as a result. Structural concerns with battery components have been found to contribute to such problems. Improvements provided herein include the utilization of thin metallized surface composite current collectors (aluminum and/or copper, as examples), high shrinkage rate materials, materials that become nonconductive upon exposure to high temperatures, and combinations thereof. Such improvements accord the ability to withstand certain imperfections (dendrites, unexpected electrical surges, etc.) within the target lithium battery through provision of ostensibly an internal fuse within the subject lithium batteries themselves that prevents undesirable high temperature results from short circuits. Battery articles and methods of use thereof including such improvements are also encompassed within this disclosure.

Of particular interest and importance is the provision of a lithium battery cell that includes needed tab leads to allow for conductance from the internal portion thereof externally to power a subject device, which may be a non-trivial provision because of the thin nature of the electrodes, and potentially that the two sides of the electrode material may not be conductive with each other. In this disclosure, provided are tabs that exhibit sufficient safety levels in combination with the internal fuse characteristics noted above while simultaneously displaying pull strength to remain in place during utilization as well as complete coverage with the thin film metallized current collectors for such an electrical conductivity result. Such tabs are further provided with effective welds for the necessary contacts and at levels that exhibit surprising levels of amperage and temperature resistance to achieve the basic internal fuse result with the aforementioned sufficient conductance to an external device. With such a tab lead component and welded structure, a further improvement within the lithium battery art is provided the industry.

Additionally, the internal fuse developments disclosed herein, exhibiting extremely thin current collector structures, further allow for the potential for repetitive folds thereof within a single cell. Such a fold possibility provides the capability of connecting two sides of a current collector which might otherwise be electrically insulated by a polymer layer situated between the two conducting layers, without the need for excessive internal weight and/or battery volume requirements. Ostensibly, the folded current collector retains the internal fuse characteristics while simultaneously permitting for such a power increase, potentially allowing for any number of power increases within any number of sized batteries without the need for the aforementioned excessive weight and volume requirements, creating new battery articles for different purposes with targeted high power levels and as high safety benefits as possible.

BACKGROUND OF THE PRIOR ART

Lithium batteries remain prevalent around the world as an electricity source within a myriad of products. From rechargeable power tools, to electronic cars, to the ubiquitous cellular telephone (and like tablets, hand-held computers, etc.), lithium batteries (of different ion types) are utilized as the primary power source due to reliability, above-noted rechargeability, and longevity of usage. With such widely utilized power sources, however, comes certain problems, some of which have proven increasingly serious. Notably, safety issues have come to light wherein certain imperfections within such lithium batteries, whether due to initial manufacturing issues or time-related degradation problems, cause susceptibility to firing potentials during short circuit events. Basically, internal defects with conductive materials have been found to create undesirable high heat and, ultimately, fire, within such battery structures. As a result, certain products utilizing lithium batteries, from hand-held computerized devices (the Samsung Galaxy Note 7, as one infamous situation) to entire airplanes (the Boeing 787) have been banned from sales and/or usage until solutions to compromised lithium batteries used therein and therewith have been provided (and even to the extent that the Samsung Galaxy Note 7 has been banned from any airplanes in certain regions). Even the Tesla line of electric cars have exhibited notable problems with lithium battery components, leading to headline-grabbing stories of such expensive vehicles exploding as fireballs due to battery issues. Widespread recalls or outright bans thus remain today in relation to such lithium battery issues, leading to a significant need to overcome such problems.

These problems primarily exist due to manufacturing issues, whether in terms of individual battery components as made or as such components are constructed as individual batteries themselves. Looked at more closely, lithium batteries are currently made from six primary components, a cathode material, a cathode current collector (such as aluminum foil) on which the cathode material is coated, an anode material, an anode current collector (such as copper foil) on which the anode material is coated, a separator situated between each anode and cathode layer and typically made from a plastic material, and an electrolyte as a conductive organic solvent that saturates the other materials thereby providing a mechanism for the ions to conduct between the anode and cathode. These materials are typically wound together into a can, as shown in Prior Art FIG. 1, or stacked. There are many other configurations that are and may be utilized for such battery production purposes, including pouch cells, prismatic cells, coin cells, cylindrical cells, wound prismatic cells, wound pouch cells, and the list goes on. These battery cells, when made correctly and handled gently, can provide energy for various applications for thousands of charge-discharge cycles without any appreciable safety incident. However, as alluded to above, certain events and, in particular, certain defects can cause internal shorting between the internal conductive materials which can lead to heat generation and internal thermal runaway, known to be the ultimate cause of fire hazards within such lithium batteries. Such events may further be caused by, as noted above, internal defects including the presence of metallic particles within the battery, burrs on the current collector materials, thin spots or holes in the separator (whether included or caused during subsequent processing), misalignments of battery layers (leaving "openings" for unwanted conductivity to occur), external debris penetrating the battery (such as road debris impacting a moving vehicle), crushing and/or destabilizing of the cell itself (due to accidents, for instance), charging the cell in a confined space, and the like. Generally speaking, these types of defects are known to cause generation of a small electronic conductive pathway between the anode and cathode. When such an event occurs, if the cell is then charged, such a conductive pathway may then cause a discharge of the cell through which ultimately generates excessive heat, thereby compromising the battery structure and jeopardizing the underlying device being powered thereby. Combined with the presence of flammable organic solvent materials as battery electrolytes (which are generally of necessity for battery operability), such excessive heat has been shown to cause ignition thereto, ultimately creating a very dangerous situation. Such problems are difficult to control once started, at the very least, and have led to significant injuries to consumers. Such a potential disastrous situation is certainly to be avoided through the provision of a battery that delivers electrical energy while not compromising the flammable organic electrolyte in such a manner.

The generation of excessive heat internally may further create shrinkage of the plastic separator, causing it to move away from, detach, or otherwise increase the area of a short within the battery. In such a situation, the greater exposed short area within the battery may lead to continued current and increased heating therein, leading to the high temperature event which causes significant damage to the cell, including bursting, venting, and even flames and fire. Such damage is particularly problematic as the potential for firing and worse comes quickly and may cause the battery and potentially the underlying device to suffer an explosion as a result, putting a user in significant danger as well.

Lithium batteries (of many varied types) are particularly susceptible to problems in relation to short circuiting. Typical batteries have a propensity to exhibit increased discharge rates with high temperature exposures, leading to uncontrolled (runaway) flaring and firing on occasion, as noted above. Because of these possibilities, certain regulations have been put into effect to govern the actual utilization, storage, even transport of such battery articles. The ability to effectuate a proper protocol to prevent such runaway events related to short circuiting is of enormous importance, certainly. The problem has remained, however, as to how to actually corral such issues, particularly when component production is provided from myriad suppliers and from many different locations around the world.

Some have honed in on trying to provide proper and/or improved separators as a means to help alleviate potential for such lithium battery fires. Low melting point and/or shrinkage rate plastic membranes appear to create higher potentials for such battery firing occurrences. The general thought has then been to include certain coatings on such separator materials without reducing the electrolyte separation capabilities thereof during actual utilization. Thus, ceramic particles, for instance, have been utilized as polypropylene and/or polyethylene film coatings as a means to increase the dimensional stability of such films (increase melting point, for example). Binder polymers have been included, as well, as a constituent to improve cohesion between ceramic particles and adhesion to the plastic membrane (film). In actuality, though, the thermal increase imparted to the overall film structure with ceramic particle coatings has been found to be relatively low, thus rendering the dominant factor for such a separator issue to be the actual separator material(s) itself.

As a result, there have been designed and implemented, at least to a certain degree, separator materials that are far more thermally stable than the polyethylene and polypropylene porous films that make up the base layer of such typical ceramic-coated separators. These low shrinkage, dimensionally stable separators exhibit shrinkage less than 5% when exposed to temperatures of at least 200° C. (up to temperatures of 250, 300, and even higher), far better than the high shrinkage rates exhibited by bare polymer films (roughly 40% shrinkage at 150° C.), and of ceramic-coated films (more than 20% at 180° C.) (such shrinkage measurement comparisons are provided in Prior Art FIG. 2). Such low shrinkage rate materials may change the mechanism of thermal degradation inside a target cell when a short occurs. Generally speaking, upon the occurrence of a short within such a battery cell, heat will always be generated. If the separator does not shrink in relation to such a short circuit event, heat will continue to be generated and "build up" until another material within the battery degrades. This phenomenon has been simulated with an industry standard nail penetration test. For instance, even with a separator including para-aramid fiber and exhibiting a shrinkage stability up to 550° C., the subject test battery showed a propensity to short circuit with unique internal results. Such a cell was investigated more closely subsequent to such treatment wherein the cell was opened, the excess electrolyte was evaporated, the cell filled with epoxy and then sectioned perpendicular to the nail, which was left in the cell. Scanning electron microscope images were then undertaken using backscattered electron imaging (BEI), which enabled mapping of the different battery elements to show the effect of such a nail penetration activity. These are shown in Prior Art FIGS. 3A and 3B.

In Prior Art FIG. 3A, it is noted that the copper layers consistently come closer to the nail than the aluminum layers. It is also noted that the high stability separator is still intact between the electrodes. Prior Art FIG. 3B shows a higher magnification of the end of one aluminum layer, showing that it ends in a layer of cracked grey matter. This was investigated with BEI, which showed the resultant matter to actually be aluminum oxide, an insulating ceramic. Such evidence led to the proposed conclusion that when the separator itself is thermally stable, the aluminum current collector will oxidize, effectively breaking the circuit (and stopping, as a result, any short circuit once the insulating aluminum oxide is formed). Once the circuit is broken, the current stops flowing and the heat is no longer generated, reversing the process that, with less stable separators, leads to thermal runaway.

This possible solution, however, is limited to simply replacing the separator alone with lower shrinkage rate characteristics. Although such a simple resolution would appear to be of great value, there still remains other manufacturing procedures and specified components (such as ceramic-coated separator types) that are widely utilized and may be difficult to supplant from accepted battery products. Thus, despite the obvious benefits of the utilization and inclusion of thermally stable separators, undesirable battery fires may still occur, particularly when ceramic coated separator products are considered safe for such purposes. Thus, it has been determined that there is at least another, solely internal battery cell structural mechanism that may remedy or at least reduce the chance for heat generation due to an internal short in addition to the utilization of such highly thermal stable separator materials. In such a situation, the occurrence of a short within such a battery cell would not result in deleterious high temperature damage due to the cessation of a completed internal circuit through a de facto internal fuse creation. Until now, however, nothing has been presented within the lithium battery art that easily resolves these problems. The present disclosure provides such a highly desirable cure making lithium battery cells extremely safe and reliable within multiple markets.

Of further and particular interest is the consideration of properly allowing for conduction of electrical charge from the subject lithium ion battery to an external source. This is generally accomplished through the utilization of a tab that is contacted and affixed to a current collector or, potentially, in some way to both anode and cathode current collectors to provide the needed conductance property with an external source. The tab ostensibly functions as a contact with such internal battery components and extends outside of the battery cell casing with contact points for such conductivity purposes. The tab must thus remain in place and not disengage from the current collector(s) and allow for unabated access to the external source without, again, dislodgement internally or disengagement therewith externally. As there have been no disclosures within the lithium ion battery art regarding such thin film current collectors, there is likewise nothing that has attempted to improve upon or optimize such tab connection issues, either. Certainly, standard types of tabs are well known and connect with large current collectors of standard battery cells; however, such do not provide any considerations as to protecting the effects of thin film current collectors (internal fuse, for instance) while still providing a dimensionally stable result overall to protect from battery failure due to structural compromises. Of especial importance is the ability to weld to a tab that consists of thin layers of metal attached to a thicker layer of electrically insulating material such as plastic. Welding solid metal tabs to solid metal foils requires only surface connections, which then allow electrical connections to the entirety of the opposing foil or tab. However, when the two faces of the current collector are electrically isolated by a supporting insulating layers, making a surface connection to a single side is ineffective, leaving the other side electrically isolated. As such, nothing has been discussed or disclosed within the current lithium ion battery art or industry to such an effect. The present disclosure, however, overcomes such paradigms and provides a result heretofore unexplored and/or understood within the pertinent industry.

ADVANTAGES AND SUMMARY OF THE DISCLOSURE

A distinct advantage of this disclosure is the ability through structural components to provide a mechanism to break the conductive pathway when an internal short occurs, stopping or greatly reducing the flow of current that may generate heat within the target battery cell. Another advantage is the ability to provide such a protective structural format within a lithium battery cell that also provides beneficial weight and cost improvements for the overall cell manufacture, transport and utilization. Thus, another advantage is the generation and retention of an internal fuse structure within a target battery cell until the need for activation thereof is necessitated. Another advantage is the provision of a lower weight battery through the utilization of a thin film base current collector that prevents thermal runaway during a short circuit or like event. Still another advantage is the ability to utilize flammable organic electrolytes materials within a battery without any appreciable propensity for ignition thereof during a short circuit or like event. Another distinct advantage is the ability to provide a sufficient conducting tab component welded, or otherwise in contact with, the internal fuse current collector, particularly in contact with both the upper surface and lower surface thereof simultaneously. Yet another advantage is the ability to create folds within the thin current collector components disclosed herein in order to allow for cumulative power generation in series of multiple current conductance internal structures to provide robust on-demand battery results without needing excessive weight or volume measurements.

Accordingly, this inventive disclosure encompasses an energy storage device comprising an anode, a cathode, at least one polymeric or fabric separator present between said anode and said cathode, an electrolyte, and at least one current collector in contact with at least one of said anode and said cathode; wherein either of said anode or said cathode are interposed between at least a portion of said current collector and said separator, wherein said current collector comprises a conductive material coated on a polymeric material substrate, and wherein said current collector stops conducting at the point of contact of an exposed short circuit at the operating voltage of said energy storage device, wherein said voltage is at least 2.0 volts. One example would be a current density at the point of contact of 0.1 amperes/mm2 with a tip size of 1 mm2 or less. Of course, for larger cells, the required threshold current density may be higher, and the cell may only stop conducting at a current density of at least 0.3 amperes/mm2, such as at least 0.6 amperes/mm2, or even at least 1.0 amperes/mm2. Such a coated polymeric material substrate should also exhibit an overall thickness of at most 25 microns, as described in greater detail below. Methods of utilizing such a beneficial current collector component within an energy storage device (whether a battery, such as a lithium ion battery, a capacitor, and the like) are also encompassed within this disclosure. Furthermore, such a thin film current collector battery article may also be provided with at least one tab contacted with a base thin film collector through between 2 and 50 welds (which may be uniformly spaced and sized) leading along the length of said current collector, wherein said at least one tab is laid upon said thin film such that said at least one tab has an exposed top surface or a bottom surface in contact with a covered surface of said thin film current collector, wherein said welds exhibit placement of conductive material passing through said tab from its exposed top surface to said covered surface of said thin film current collector. Further encompassed herein is the utilization of multiple current collectors as disclosed above which may be folded to provide separate power generation regions that are connected in series within a single battery article.

Additionally, much larger current densities may be supported for a very short period of time, or in a very small tipped probe. In such a situation, a larger current, such as 5 amperes, or 10 amperes, or even 15 amperes, may be connected for a very short time period [for example, less than a second, alternatively less than 0.1 seconds, or even less than 1 millisecond (0.001 seconds)]. Within the present disclosure, while it may be possible to measure a larger current, the delivery time for such a current is sufficiently short such that the total energy delivered is very small and not enough to generate enough heat to cause a thermal runaway event within the target battery cell. For example, a short within a conventional architecture cell has been known to generate 10 amperes for 30 seconds across 4.2 volts, a result that has delivered 1200 joules of energy to a small local region within such a battery. This resultant measurement can increase the temperature of a 1-gram section of the subject battery by about 300° C., a temperature high enough to not only melt the conventional separator material present therein, but also drive the entire cell into a runaway thermal situation (which, as noted above, may cause the aforementioned compromise of the electrolyte materials present therein and potential destruction of not only the subject battery but the device/implement within which it is present and the surrounding environment as well. Thus, it is certainly a possibility that the ability to reduce the time for short circuit duration, as well as the resulting delivered energy levels associated within such a short to a low joules measurement, thermal runaway (and the potential disaster associated therewith) may be avoided, if not completely prevented. For instance, the reduction of short circuit residence time within a current collector to 1 millisecond or less can then subsequently reduce the amount of delivered energy to as low as 0.04 joules (as opposed to 1200 joules, as noted above, leading to excessive, 300 degrees Celsius or greater, for example, within a 1-gram local region of the subject battery). Such a low level would thus only generate a temperature increase of 0.01° C. within such a 1-gram local region of battery, thus preventing thermal runaway within the target cell and thus overall battery.

Therefore, it is another significant advantage of the present disclosure to provide the battery a current collector that drastically limits the delivery time of a current level applied to the target current collector surface through a probe tip (in order to controllably emulate the effect of an internal manufacturing defect, a dendrite, or an external event which causes an internal short within the subject battery) to less than 1 second, preferably less than 0.01 seconds, more preferably less than 1 millisecond, and most preferably, perhaps, even less than 100 microseconds, particularly for much larger currents. Of course, such a current would be limited to the internal voltage of the cell, which might be 5.0 V, or 4.5 V, or 4.2 V or even less, such as 4.0 V or 3.8 V, but with a minimum of 2.0 V.

Such a novel current collector component is actually counterintuitive to those typically utilized and found within lithium (and other types) of batteries and energy storage devices today. Standard current collectors are provided are conductive metal structures, such as aluminum and/or copper panels of thicknesses that are thought to provide the necessary strength to survive the manufacturing process. The strength of these metals necessitates a thickness that is far in excess of the electrical needs of the cell. For example, the electrical needs of the cell dictate a metal thickness on the order of 500 nm of Aluminum, while the thinnest solid foil aluminum that can survive the manufacturing process is around 10 um. It appears, however, that such a belief has actually been misunderstood, particularly since the thick panels prevalent in today's energy storage devices will actually support any current the typically low impedance cell can deliver when a short occurs and thus contribute greatly to runaway temperatures if and when such a situation occurs. Such a short may be caused, for example, by a dendritic formation between the anode and cathode. Such a malformation (whether caused at or during manufacture or as a result of long-term usage and thus potential degradation) may allow for voltage to pass unexpectedly from the anode to the cathode, thereby creating an increase in current and consequently in temperature at the location such occurs. Indeed, one potential source of short circuit causing defect are burrs that form on the edges of these thick typical current collectors when they are slit or cut with worn blades during repetitive manufacturing processes of multiple products (as is common nowadays). It has been repeatedly analyzed and understood, however, that the standard current collector materials merely exhibit a propensity to create a durable short circuit and allow for temperature increase, and further permitting the current present during such an occurrence to continue through the device, thus allowing for unfettered generation and movement, leaving no means to curtail the current and thus temperature level from increasing. This problem leads directly to runaway high temperature results; without any internal means to stop such a situation, the potential for fire generation and ultimately device immolation and destruction is typically imminent. Additionally, the current pathway (charge direction) of a standard current collector remains fairly static both before and during a short circuit event, basically exhibiting the same potential movement of electric charge as expected with movement from cathode to anode and then horizontally along the current collector in a specific direction. With a short circuit, however, this current pathway fails to prevent or at least curtail or delay such charge movement, allowing, in other words, for rapid discharge in runaway fashion throughout the battery itself. Coupled with the high temperature associated with such rapid discharge leads to the catastrophic issues (fires, explosions, etc.) noted above.

To the contrary, and, again, highly unexpected and counterintuitive to the typical structures and configurations of lithium batteries, at least, the utilization of a current collector of the instant disclosure results in an extremely high current density measurement (due to the reduced thickness of the conductive element) and prevention of charge movement (e.g., no charge direction) in the event of a short circuit. In other words, with the particular structural limitations accorded the disclosed current collector component herein, the current density increases to such a degree that the material is unable to remain intact and fails by vaporizing. The total amount of energy necessary to cause this failure of the conductor is low as discussed above and results in very low temperatures generated from the event. Combined with the other structural considerations of such a current collector component, namely the actual lack of a dimensionally stable polymeric material in contact with such a conductive material layer, the conductive material oxidizes instantly at the charge point thereon, leaving, for example, aluminum or cupric oxide, both nonconductive materials. With such instantaneous nonconductive material generation, the short circuit charge appears to dissipate as there is no direction available for movement thereof. Thus, with the current collector as now described, an internal short circuit occurrence results in an immediate cessation of current, effectively utilizing the immediate high temperature result from such a short to generate a barrier to further charge movement. As such, the lack of further current throughout the body of the energy storage device (in relation to the short circuit, of course) mutes such an undesirable event to such a degree that the short is completely contained, no runaway current or high temperature result occurs thereafter, and, perhaps most importantly, the current collector remains viable for its initial and protective purposes as the localized nonconductive material then present does not cause any appreciable reduction in current flow when the energy storage device (battery, etc.) operates as intended. Furthermore, the relatively small area of nonconductive material generation leaves significant surface area, etc., on the current collector, for further utilization without any need for repair, replacement, or other remedial action. The need to ensure such a situation, which, of course, does not always occur, but without certain precautions and corrections, as now disclosed, the potential for such a high temperature compromise and destruction event actually remains far higher than is generally acceptable. Thus, the entire current collector, due to its instability under the conditions of a short circuit, becomes a two-dimensional electrical fuse, preventing the potentially disastrous high currents associated with short circuits by using the instantaneous effect of that high current to destroy the ability of the current collector to conduct current at the point of the short circuit.

Such advantages are permitted in relation to such a novel resultant current collector that may be provided, with similar end results, through a number of different alternatives. In any of these alternative configurations, such a current collector as described herein functions ostensibly as an internal fuse within a target energy storage device (e.g., lithium battery, capacitor, etc.). In each instance (alternative), however, there is a current collector including a polymeric layer that is metallized on one or both sides thereof with at least one metallized side in contact with the anode or cathode of the target energy storage device. One alternative then is where the total thickness of the entire metallized (coated) polymeric substrate of the current collector is less than 20 microns, potentially preferably less than 15 microns, and potentially more preferably less than 10 microns, all with a resistance measurement of less than 1 ohm/square potentially preferably less than 0.1 ohms/square, and potentially more preferably less than 50 milli-ohms/square. Typical current collectors may exhibit these features but do so at far higher weight than those made with reinforcing polymeric substrates and without the inherent safety advantages of this presently disclosed variation. For example, a copper foil at 10 microns thick may weight 90 grams/m2. However, a copperized foil may weigh as little as 50 grams/m2, or even as little as 30 gram/m2, or even less than 20 grams/m2, all while delivering adequate electrical performance required for the cell to function. In this alternative structure, however, the very thin component also allows for a short to react with the metal coat and in relation to the overall resistance levels to generate, with an excessively high temperature due to a current spike during such a short, a localized region of metal oxide that immediately prevents any further current movement therefrom.

Another possible alternative for such a novel current collector is the provision of a temperature dependent metal (or metallized) material that either shrinks from a heat source during a short or easily degrades at the specific material location into a nonconductive material (such as aluminum oxide from the aluminum current collector, as one example and as alluded to above in a different manner). In this way, the current collector becomes thermally weak, in stark contrast to the aluminum and copper current collectors that are used today, which are quite thermally stable to high temperatures. As a result, an alloy of a metal with a lower inherent melting temperature may degrade under lower shorting current densities, improving the safety advantages of the lithium-based energy device disclosed herein. Another alternative is to manufacture the current collector by coating a layer of conductive material, for example copper or aluminum, on fibers or films that exhibit relatively high shrinkage rates at relatively low temperatures. Examples of these include thermoplastic films with melt temperatures below 250° C., or even 200° C., and can include as non-limiting examples polyethylene terephthalate, nylon, polyethylene or polypropylene. Another possible manner of accomplishing such a result is to manufacture a current collector by coating a layer of conductive material, for example copper or aluminum, as above, on fibers or films that can swell or dissolve in electrolyte when the materials are heated to relatively high temperatures compared to the operating temperatures of the cells, but low compared to the temperatures that might cause thermal runaway. Examples of such polymers that can swell in lithium ion electrolytes include polyvinylidene fluoride and poly acrylonitrile, but there are others known to those with knowledge of the art. Yet another way to accomplish such an alternative internal electrical fuse generating process is to coat onto a substrate a metal, for example aluminum, that can oxidize under heat, at a total metal thickness that is much lower than usually used for lithium batteries. For example, a very thin aluminum current collector as used today may be 20 microns thick. A coating thickness of a total of less than 5 microns would break the circuit faster, and one less than 2 microns, or even less than 1 micron would break the circuit even faster. Even still, another way to accomplish the break in conductive pathway is to provide a current collector with limited conductivity that will degrade in the high current densities that surround a short, similar to the degradation found today in commercial fuses. This could be accomplished by providing a current collector with a resistivity of greater than 5 mOhm/square, or 10 mOhm/square, or potentially preferably greater than 20 mOhm/square, or, a potentially more preferred level of greater than 50 mOhm/square. These measurements could be on one side, or on both sides of a material coated on both sides. The use of current collectors of different resistivities may further be selected differently for batteries that are designed for high power, which might use a relatively low resistance compared to cells designed for lower power and higher energy, and/or which might use a relatively high resistance. Still another way to accomplish the break in conductive pathway is to provide a current collector that will oxidize into a nonconductive material at temperatures that are far lower than aluminum, thus allowing the current collector to become inert in the area of the short before the separator degrades. Certain alloys of aluminum will oxidize faster than aluminum itself, and these alloys would cause the conductive pathway to deteriorate faster or at a lower temperature. As possible alternatives, there may be employed any type of metal in such a thin layer capacity and that exhibits electrical conductivity, including, without limitation, gold, silver, vanadium, rubidium, iridium, indium, platinum, and others (basically, with a very thin layer, the costs associated with such metal usage may be reduced drastically without sacrificing conductivity and yet still allowing for the protections from thermal runaway potentials during a short circuit or like event). As well, layers of different metals may be employed or even discrete regions of metal deposited within or as separate layer components may be utilized. Certainly, too, one side of such a coated current collector substrate may include different metal species from the opposing side, and may also have different layer thicknesses in comparison, as well.

One way to improve the electrical properties of the cell would be to ensure that a coated current collector includes two conductive coated sides, ostensibly allowing for conductivity from the coating on one side to the coating on the other side. Such a result is not possible for a non coated polymer film, for instance. However, it has been realized that such a two-sided conductivity throughput can be achieved by, as one non-limiting example, a nonwoven including a certain percentage of conducting fibers, or a nonwoven loaded with conductive materials, or a nonwoven made from a conductive material (such as carbon fibers or metal fibers), or, as noted above, a nonwoven containing fibers coated with a conductive material (such as fibers with a metal coating on the surface). Another type of novel thin current collector material exhibiting top to bottom conductivity may be a film that has been made conductive, such as through the utilization of an inherently conductive material (such as, for example, conductive polymers such as polyacetylene, polyaniline, or polyvinylpyrrolidone), or via loading with a conductive material (such as graphite or graphene or metal particles or fibers) during or after film manufacture. Additionally, another possible two-sided thin current collector material is a polymer substrate having small perforated holes with sides coated with metal (aluminum or copper) during the metallization process. Such a conductivity result from one side to the other side would not need to be as conductive as the conductive coatings.

Thus, such alternative configurations garnering ostensibly the same current collector results and physical properties include a) wherein the total thickness of the coated polymeric substrate is less than 20 microns with resistance less than 1 ohm/square, b) the collector comprising a conductive material coated on a substrate comprising polymeric material, wherein the polymeric material exhibits heat shrinkage at 225° C. of at least 5%, c) wherein the collector metallized polymeric material swells in the electrolyte of the battery, such swelling increasing as the polymeric material is heated, d) wherein the collector conductive material total thickness is less than 5 microns when applied to a polymeric substrate, e) wherein the conductivity of the current collector is between 10 mOhm/square and 1 ohm/square, and f) wherein the metallized polymeric substrate of the collector exhibits at most 60% porosity. The utilization of any of these alternative configurations within an energy storage device with a separator exhibiting a heat shrinkage of less than 5% after 1 hour at 225° C. would also be within the purview of this disclosure. The overall utilization (method of use) of this type of energy storage device (battery, capacitor, etc.) is also encompassed herein.

While the primary advantage of this invention is enhanced safety for the cell, there are other advantages, as alluded to above, including reduced weight of the overall energy storage device through a reduced amount of metal weight in relation to such current collector components. Again, it is completely counterintuitive to utilize thin metallized coated polymeric layers, particularly of low dimensionally stable characteristics, for current collectors within such battery articles. The present mindset within this industry remains the thought that greater amounts of actual metal and/or insulator components are needed to effectuate the desired protective results (particularly from potential short circuit events). It has now been unexpectedly realized that not only is such a paradigm incorrect, but the effective remedy to short circuiting problems within lithium batteries, etc., is to reduce the amount of metal rather than increase and couple the same with thermally unstable base layers. Thus, it has been not only realized, again, highly unexpectedly, that thin metal layers with such unstable base layers provide the ability to combat and effectively stop discharge events during short circuits, the overall effect is not only this far safer and more reliable result, but a significantly lower overall weight and volume of such component parts. Thus, the unexpected benefits of improved properties with lowered weight and volume requirements within energy storage products (batteries, etc.), accords far more to the industry than initially understood.

As a further explanation, aluminum, at a density of 2.7 g/cm$^3$, at 20 microns thick would weigh 54 g/m$^2$. However, the same metal coated at 1 micron on a 10-micron thick polypropylene film (density 0.9 g/cm3) would weigh 11.7 g/m$^2$. This current collector reduction in weight can reduce the weight of the entire target energy storage device (e.g., battery), increasing mobility, increasing fuel mileage or electric range, and in general enhance the value of mobile electric applications.

Additionally, because of the high strength of films, the above example can also be made thinner, a total thickness of 11 microns compared to 20 microns, for example, again reducing the volume of the cell, thereby effectively increasing the energy density. In this way, a current collector of less than 15 microns, preferably less than 12, more preferably less than 10, and most preferably less than 8 microns total thickness, can be made and utilized for such a purpose and function.

With the bulk resistivity of aluminum at $2.7\times10^{-8}$ ohm-m and of copper at $1.68\times10^{-8}$ ohm-m, a thin coating can be made with less than 1 ohm/square, or less than 0.5 ohms/square, or even less than 0.1 ohms/square, or less than 0.05 ohms/square. The thickness of these conductive coatings could be less than 5 microns, preferably than 3 microns, more preferably less than 2 microns, potentially most preferably even less than 1 micron. It is extremely counterintuitive, when standard materials of general use in the market contain 10 microns or more of metal, that suitable performance could be obtained using much less metal. Indeed, most of the metal present in typical storage devices is included to give suitable mechanical properties for high speed and automated processing. It is one of the advantages of this invention to use a much lower density polymer material to provide the mechanical properties, allowing the metal thickness to be reduced to a level at which the safety of the cell is improved because of the inability of the current collector to support dangerously high current densities that result from internal electrical shorts and result in thermal runaway, smoke and fire.

Additionally, these conductive layers can be made by multiple layers. For example, a layer of aluminum may be a base layer, coated by a thin layer of copper. In this way, the bulk conductivity can be provided by the aluminum, which is light, in expensive and can easily be deposited by vapor phase deposition techniques. The copper can provide additional conductivity and passivation to the anode, while not adding significant additional cost and weight. This example is given merely to illustrate and experts in the art could provide many other multilayer conductive structures, any of which are excellent examples of this invention.

These thin metal coatings will in general result in higher resistance than in an aluminum or copper current collector of normal practice, providing a distinguishing feature of this invention in comparison. Such novel suitable current collectors can be made at greater than 10 mOhm/square, preferably greater than 20 mOhm/square, more preferably greater than 50 mOhm/square, and potentially most preferably even greater than 100 mOhm/square. Additionally, cells made with the thermally weak current collectors described above could be made even more safe if the separator has a high thermal stability, such as potentially exhibiting low shrinkage at high temperatures, including less than 5% shrinkage after exposure to a temperature of 200° C. for 1 hour, preferably after an exposure of 250° C. for one hour, and potentially more preferably after an exposure to a temperature of 300° C. for one hour. Existing separators are made from polyethylene with a melt temperature of 138° C. and from polypropylene with a melt temperature of 164° C. These materials show shrinkage of >50% at 150° C., as shown in FIG. 2; such a result is far too high for utilization with a thin current collector as now described herein. To remedy such a problem, it has been realized that the utilization of certain separators that shrink less than 50% at 150° C., or even less than 30%, or less than 10%, as measured under NASA TM-2010-216099 section 3.5 are necessary. Even ceramic coated separators show significant shrinkage at relatively modest temperatures, either breaking entirely or shrinking to more than 20% at 180° C. It is thus desirable to utilize a separator that does not break during the test, nor shrink to more than 20% at an exposure of 180° C. (at least), more preferably more than 10%, when measured under the same test standard. The most preferred embodiment would be to utilize a separator that shrinks less than 10% when exposed to a temperature of 200° C., or 250° C., or even 300° C.

For any of these metallized substrates, it is desirable to have a low thickness to facilitate increase the energy density of the cell. Any means can be used to obtain such thickness, including calendering, compressing, hot pressing, or even ablating material from the surface in a way that reduces total thickness. These thickness-reducing processes could be done before or after metallization. Thus, it is desirable to have a total thickness of the metallized substrate of less than 25 microns, preferably less than 20 microns, more preferably less than 16 microns, and potentially most preferably less than 14 microns. Commercial polyester films have been realized with thicknesses of at most 3 microns, and even lower at 1.2 microns. These types could serve as suitable substrates and allow the total thickness of the current collector to be less than 10 microns, preferably less than 6 microns, and more preferably less than 4 microns. Such ultra-thin current collectors (with proper conductivity as described above and throughout) may allow much higher energy density with improved safety performance, a result that has heretofore gone unexplored.

It is also desirable to have low weight for these metallized substrates. This could be achieved by the use of low-density polymer materials such as polyolefins or other low-density polymers including polyethylene, polypropylene, and polymethylpentene, as merely examples. It could also be achieved by having an open pore structure in the substrate or even through utilization of low basis weight substrates. Thus, the density of the polymer used in the substrate material could be less than 1.4 g/cm$^3$, preferably less than 1.2 g/cm$^3$, and potentially more preferably less than 1.0 g/cm$^3$. Also, the areal density of the substrate material could be less than 20 g/m$^2$, preferably less than 16 g/m$^2$, and potentially most preferably less than 14 g/m$^2$. Additionally, the areal density of the metal coated polymer substrate material could be less than 40 g/m$^2$, preferably less than 30 g/m$^2$, more preferably less than 25 g/m$^2$, and potentially most preferably less than 20 g/m$^2$.

Low weight can also be achieved with a porous polymer substrate. However, the porosity must not be too high for these materials, as such would result in low strength and high thickness, effectively defeating the purpose of the goals involved. Thus, such base materials would exhibit a porosity lower than about 60%, preferably lower than 50%, and potentially more preferably lower than 40%. Since solid materials can be used for this type of metal coated current collector, there is no lower limit to the porosity.

High strength is required to enable the materials to be processed at high speeds into batteries. This can be achieved by the use of elongated polymers, either from drawn fibers or from uniaxially or biaxially drawn films.

As presented below in the accompanying drawings the descriptions thereof, an energy storage device, whether a battery, a capacitor, a supercapacitor and the like, is manufactured and thus provided in accordance with the disclosure wherein at least one current collector that exhibits the properties associated with no appreciable current movement after a short is contacting a cathode, an anode, or two separate current collectors contacting both, and a separator and electrolytes, are all present and sealed within a standard (suitable) energy storage device container, is provided. The cathode, anode, container, electrolytes, and in some situations, the separator, components are all standard, for the most part. The current collector utilized herewith and herein, however, is, as disclosed, not only new and unexplored within this art, but counterintuitive as an actual energy storage device component. Such is, again, described in greater detail below.

As noted above, in order to reduce the chances, if not totally prevent, thermal runaway within a battery cell (particularly a lithium ion rechargeable type, but others are possible as well, of course), there is needed a means to specifically cause any short circuit therein to basically exist within a short period of time, with reduced residence time within or on the subject current collector, and ultimately exhibit a resultant energy level of de minimis joule levels (i.e., less than 10, preferably less than 1, and most preferably less than 0.01). In such a situation, then, and as alluded to earlier, the electrical pathway from anode to cathode, and through the separator, with the thin conductive current collector in place, and organic flammable electrolyte present, it has been observed that the low-weight, thin current collector allows for such a desirable result, particularly in terms of dissipation of rogue charges at the collector surface and no appreciable temperature increase such that ignition of the electrolyte component would be imminent. Surprisingly, and without being bound to any specific scientific explanation or theory, it is believed that the conductive nature of the thin current collector material allows for short circuit electrical charges to merely reach the thin conductive current collector and immediately create a short duration high-energy event that reacts between the metal at the current collector surface with the electrical charge itself, thereby creating a metal oxide to form at that specific point on the current collector surface. The metal oxide provides insulation to further electrical activity and current applied dissipates instantaneously, leaving a potential deformation within the collector itself, but with the aforementioned metal oxide present to protect from any further electrical charge activity at that specific location. Thus, the remaining current collector is intact and can provide the same capability as before, thus further providing such protections to any more potential short circuits or like phenomena. In the case of thermal runaway in prior art battery products, the anode, cathode, current collectors and separator comprise the electrical pathway which generate heat and provide the spark to ignite the cell in reaction to a short circuit, as an example. The further presence of ion transporting flammable electrolytes thus allows for the effective dangers with high temperature results associated with such unexpected electrical charges. In essence, the heat generated at the prior art current collector causes the initial electrochemical reactions within the electrolyte materials, leading, ultimately to the uncontrolled ignition of the electrolyte materials themselves. Thus, the disclosed inventive current collector herein particularly valuable when utilized within battery cells including such flammable electrolytes. As examples, then, such electrolytes generally include organic solvents, such as carbonates, including propylene carbonate, ethylene carbonate, ethyl methyl carbonate, di ethyl carbonate, and di methyl carbonate, and others. These electrolytes are usually present as mixtures of the above materials, and perhaps with other solvent materials including additives of various types. These electrolytes also have a lithium salt component, an example of which is lithium hexafluorophosphate, $LiPF_6$. Such electrolytes are preferred within the battery industry, but, as noted, do potentially contribute to dangerous situations. Again, this inventive current collector in association with other battery components remedies these concerns significantly and surprisingly.

One way that this current collector will exhibit its usefulness is in the following test. A current source with both voltage and current limits can be set to a voltage limit similar to the operating voltage of the energy storage device in question. The current can then be adjusted, and the current collector tested under two configurations. In the first, a short strip of the current collector of known width is contacted through two metal connectors that contact the entire width of the sample. The current limit of the current source can be raised to see if there is a limit to the ability of the material to carry current, which can be measured as the total current divided by the width, achieving a result in A/cm, herein designated as the horizontal current density. The second configuration would be to contact the ground of the current source to one of the full width metal contacts, and then touch the tip of the probe, approximately 0.25 $mm^2$, to a place along the strip of the current collector. If the current is too high, it will burn out the local area, and no current will flow. If the current is not too high for the current collector, then the full current up to the limit of the current source will flow. The result is a limit of current in A/mm2, herein designated as the vertical current density. In this way, a current collector which can reach a high current under both configurations would be similar to the prior art, and a current collector which could support the horizontal current when contacted under full width, but would not support a similar vertical current under point contact would be an example of the invention herein described.

For example, it may be desirable for a current collector to be able to support horizontal current density 0.1 A/cm, or 0.5 A/cm, or 1 A/cm or 2 A/cm or even 5 A/cm. And for a current collector that could support a horizontal current density as above, it would be desirable not to support a vertical current density of 0.1 $A/mm^2$, or 0.5 $A/mm^2$, or 1 $A/mm^2$ or 2 $A/mm^2$ or even 5 $A/mm^2$.

As alluded to above, there is also generally present within lithium ion battery cells a tab weld to join the internal components, particularly the current collectors, together to connect to a tab lead for transfer of charge to an external source. In this situation, with the current collectors of extremely thin types, it is paramount such a tab lead effectively contact the internal metallized film collectors and remain sufficiently in place to contact an external source as well. Additionally, due to the effectiveness of the aforementioned and unexpectedly good metallized thin film current collectors to permit the needed operations of the battery cell itself, as well as the ability to provide the internal fuse characteristics to prevent runaway current during a possible problem (dendrite formation, etc.), such a tab must not exhibit any degree of displacement or ineffectiveness to combat the same potential runaway charge issues themselves. In other words, the effectiveness of the internal fuse results must not be undone or compromised by tab issues. Surprisingly, it has been determined that such needed characteristics are permissible with such tab components.

To that level, then, it was realized that the metallized thin film collectors actually allow for an effective and strong weld of the tab thereto and with the ability to actually allow for conductance at both film sides. The tab itself is actually thicker than each individual current collector and when placed in contact with one another the weld may be undertaken to a depth that is partially through the tab material in relation to the shape and depth of the weld itself. The surprising result, however, is that the weld may actually pass through the tab in a thin "stream" or like formation, thus allowing for conductance through such a weld material to the tab. In this manner, the limited, though effective, conduction path is generated in order to not only allow for the needed conductance at the weld location to the tab (and then out of the battery cell casing to an external source), but also there is provided a means to limit the actual amperage and temperature generated by such a conductive flow at each weld location. Such a result allows for the aforementioned control of runaway conductivity from the metallized film current collectors should a short (dendrite formation, etc.) occur since the electrical charge will stop at the actual current collector surface and no other pathway for a runaway charge is provided. The welds may thus be provided along the length of the tab component running along the current collector with as many as five, as one example, spaced uniformly from one another, thus allowing for effective conductivity from the foil collector(s) to the tab through the battery casing to the external source. The limited number of welds thus reduces, as well, the number of possible runaway charge sites, albeit with each exhibiting limited amperage, but with multiples such levels show increases in some situations, certainly. However, for high power or high current batteries, the number of welds per tab can be increased to accommodate the high amount of current needed for the battery to be effective in its application. In this case, it is possible to require a larger number of welds, potentially as many as 10, or 20, or even 50 welds per tab. In rare circumstances in very high power or very high current cells, even more than 50 welds may be necessary. The welds provide a base strength, additionally, to prevent movement of the tab during utilization. Stability and rigidity and needed to ensure proper operation of the battery overall. The limited welds do provide a certain level of reliability in this respect, while the addition of pull tape thereover as applied to the current collector films also aids in protecting from such potential problems as well. In effect, the metallized thin film current collectors are unexpectedly good for the prevention of runaway charges during a short. However, the need for tab leads in sufficient contact with such collectors in order to allow for effective conductivity external the battery cell requires a structural situation that allows for such metallized thin current collector film utilization with standard tab components. As noted above, the ability to determine proper dimensions of both current collector film (s) and tabs with suitable welds for effective attachment and contact for electrical current to pass through effectively for battery operation, while still exhibiting the proper low potential for runaway charge has proven difficult, particularly in view of the specific and accepted thick monolithic current collector components of the state of the art today. This unexpectedly effective result, particularly with the tab contact and pull strength characteristics determined as noted above, accords a full lithium ion battery that may be provided with reduced weight or greater internal capacity for other components without sacrificing battery power generation capability while simultaneously providing complete protection from runaway charges during short circuit events.

Additionally, of importance is the ability to utilize heretofore unexplored welding operations and methodologies to provide effective and reliable connections between such metallic conductors (again, tabs) and electrodes within thin metallized film current collector containing power generating cells. The need for such effective connections to not only impart safety aspects to such cells (with the thin film current collectors described herein) but the important conductivity from electrode to the outside world (in other words to allow for proper and effective utilization of such a power generating cell, i.e., battery, capacitor, and the like). Such power cells, which may be configured and structured with containers noted above, as well as, without limitation, metallized plastic bags, metal cans, and rigid/semi-rigid plastic enclosures, would, again, exhibit much improved potential for thermal runaway with metallized thin film current collectors. The proper connection between such power cells and external contacts is thus of great necessity for actual functional purposes, particularly with the complexities of providing such reliable and secure connections with thin film materials.

To that end, and, again, in addition to the descriptions and disclosures of metallized thin film metallized current collectors and general tab possibilities above, it has been realized that certain weld configurations and actual welding tools provide for such beneficial and surprisingly effective tab-electrode connections for such unique power cell structures. Particularly important battery (power cell) types include, without limitation, pouch, cylinder, prismatic and jelly roll structures as these types of cells are most prevalent within certain industries and allow for greater versatility for subject devices, as well.

The dynamics of such unique weld methods and operations take into effect the metallized thin film current collector in a specific configuration, particularly one with at least one layer of metallized film having at least two metallization layers separated by a polymer substrate. The weld must then be imparted to such a structure such that the divot of the weld extrudes through from the first metallized layer through the polymer substrate and to the second metallized layer. In this manner, the utilization of a proper weld anvil creates a certain three-dimensional divot within a subject region of the current collector such that the top (first) metallized layer becomes contacted with the lower (second) metallized layer, the polymer substrate moves in opposing relation to the weld divot and within the confines of the two metallized layers, and the resultant welded structure retains the top and lower metallized layers separated by the polymer substrate outside of the welded region. With this weld result, the ability to create such a connection between the current collector and a tab structure is thus available without losing the necessary safety benefits of the thin film current collector itself within the target cell. Of course, this may also apply to a film that is metallized on only one side, and electrical contact is desired to a component on the other side of the polymer substrate, such as a tab or the metallized side of a subsequent metallized thin film current collector. In this case, the weld must then be imparted such that the divot of the weld extrudes through from the metallized layer through the polymer substrate to the component with which electrical contact is desired.

The inclusion of a tab material within a weld thus allows for the weld anvil to press through the tab and move the current collector (again, thin film of at least two metallized layers separated by a polymer substrate) in the same manner, thus creating a divot within the tab and current collector simultaneously for connection capabilities between both structure to form a composite for conductivity purposes. Such tab weld attachment may be undertaken on either of the top or bottom of such a thin film current collector as well, thereby allowing for the tab to basically connect with the top and bottom metallized layers simultaneously in either manner. Thus, with the further inclusion of an electrode (coating or otherwise) on the current collector, the ability to properly and effectively connect the entire power cell structure (electrode/current collector, at least) to the target tab for the further provision of conductivity external of such an improved safety (thin film current collector) power cell is achieved. This ability to suitable and effectively provide conductivity from the current collector (both metallized film layers) simultaneously to such a tab for external power transmission allows for the overall functionality and, for that matter, proper utilization of such a safe battery device that has, again, heretofore been unexplored. Without the effective weld operation for both metallized film layers of the base current collector, such a power transfer would be hindered, basically. Of course, as alluded to above, the current collector may be of multiple layered structures of a single polymer substrate separating two metallized layers in each such structure (in other words, repeating units of thin film polymer substrate with top and bottom metallized films as desired; at least one such base structure may be present with any number layered on one another up to about 12-15 or more, depending on the end use thereof. Such multiple base structure power cells would require the same needed weld connection(s) with at least one base substrate/top and bottom metallized film structures for functionality of the target power cell. The number of layers of metallized film that are welded together may be 15, or may be higher, as many as 25, or even 50 in a single stack. If the number gets too high, the distance that the metallized film is extruded to make contacts with the layers below may become very high. Thus, the maximum number of layers in a stack may be less than 250, or preferably less than 100, or even more preferably less than 50.

More than one weld divot may be employed for such connection purposes between the thin film current collector (again, polymer substrate with top and bottom metallized films, and at least one such structure present) and the tab. Such welds may be provided within a small region of the current collector (and thus tab) or may be provided as repeated divots of the same three dimensional structure in patterns thereof or possibly with different three-dimensional structures in patterned or random configurations. Furthermore, random configurations of the same three dimensional weld structures may be employed as well. The importance of such weld divots is to impart, again, the proper and effective connections between the tab and the current collector while allowing for the thin film to retain the needed safety aspects associated thereof (reduce the propensity of thermal runaway) while still retaining the proper ability to transfer charge and thus conductivity external to the power cell itself. Such weld structures allow, again, for three dimensional structures that allow for limited regions of the tab and current collector to contact with a certain uniformity of displacement of polymer substrate allowing for the top and bottom metallized film layers to contact one another with the tab as well manipulated for contact with such a top and bottom metallized layer contact. Multiple divots allow for increased conductivity on demand, as well as increased surface area connections for more reliable attachment between tab and current collector, as well. Such three-dimensional weld divots may be made from any number of weld anvil structures, including, without limitation, rectangular (linear) three dimensional anvils, spherical (or semi-spherical), truncated pyramid (with a square bottom and a smaller square top), rounded pyramid (with curved edges at the top thereof), and the like. Such structures impart divots that will allow for the top metallized layer (or bottom depending on the location of the actual weld, whether on the top or bottom of the current collector) to deform downwardly without breaking the film and contact for a certain area with the bottom metallized layer, while the polymer substrate displaces but remains in contact to the manipulated metallized film layers to provide a force against such a manipulated region thereof for dimensional stability subsequent to such a weld operation. As noted above, such welds may be provided singly within such a tab/current collector composite structure, or may be applied in multiples for increased surface area contact between the two composite components, either uniformly, randomly, entirely (over a certain region), or sparsely (within a region). Again, the ability to impart the safety aspects of the current collector structure within a target power cell while allow for proper and effective connection with a tab for conductivity purposes is paramount in this situation. The thin film collectors can thus, unexpectedly, be utilized with such resultant effectiveness in this weld operation with the tab to great effect.

Such a welding operation may utilize ultrasonic, heat application (through an anvil, for instance), or pressure application (again, through the utilization of an anvil). Such applications may include the utilization of a single anvil or multiple anvils simultaneously within a grid that applies to and over a certain region of the tab and current collector/electrode bodies, as well (as noted above). Such welding capabilities thus allow for a number of other beneficial opportunities that have not been explored in the past. These include the potential for a configuration of multiple current collectors and multiple tabs, all welded together, either entirely or separately. A single tab may be connected through welding to multiple layers of current collectors, as well, allowing for the connections of such top and bottom metallized layers within such multi-layer structures (at least two, and any number up to, for instance, 25). Also, a staggered configuration of current collectors and tabs may be employed, if desired, without compromising safety or power transfer, as well. Such an electrode tab may have an expanded region to allow more welds for, again, greater surface area for conductivity and/or connection purposes. Additionally, the tab/electrode connection may be in combination with a narrowed region of tab to provide a "built in" cell fuse. Such a cell fuse may impart the ability, as well, to thereby increase the safety aspects to an even greater degree. Additional metal layers may be inserted between the current collector film layers, as well, to aid in the weld capabilities between such film stacks (particularly with multiple layers present, again, up to about 25).

Furthermore, as it concerns the tab itself (or electrical connector, as it is also referred to), such a component is, as noted above, welded to the electrode and subsequently connected to either other cell components (within a container), or attached to (and possibly through) a target cell casing, thereby functioning as an external electrode for connection with an external device (to transfer power thereto, in other words).

As alluded to above, welding operations and processes may be undertaken on the top (tab side) or bottom (current collector film side) of the target composite cell structure. In such situations, welds may be from the tab side (through the utilization of a moving horn device thereon such a surface), with the anvil (non-moving) pressed on the film side (as noted above). The opposite may be employed, however, with the anvil pressed into the tab with a moving horn underneath on the film side (to provide a smooth structure for the anvil to press against, ultimately). In either situation, the ability to impart the desired weld divot for connection and adherence purposes is permitted in relation to the thin metallized current collector for such a safe, reliable and effective connection externally through the tab.

Furthermore, the ability to provide further beneficial welding capabilities has been realized in relation to weld stack configurations heretofore unexplored, again, within any thin film current collector situations. For instance, a single tab may be employed with at least one and up to about, without any limitation, 25 metallized film layers. Conversely, perhaps, multiple tabs with from one to about 25 metallized film layers may be utilized with tabs present, as one non-limiting possibility, at the top and bottom of the metallized film layer stack. Alternatively, then, such multiple tabs may also be interspersed throughout the metallized filmi layer (current collector) stack, uniformly or sparsely, as needed and/or desired. This allows for a number of different results and possibilities for power generation and transfer with safe (low thermal runaway propensity, again) cells.

Additionally, then a single tab may be utilized that is sufficient in length to fold over and around a thin film current collector (or multi-layers thereof) and basically welded not only to the thin film collector(s), but to itself (acting like a clamp around the collector(s), in effect. As mentioned above, the utilization of multiple welds aids in providing sufficient connection for overall strength to the composite generated thereby as well as increased conductivity potential from the power cell externally through the tab. The number of welds used may be numbered to achieve a maximum current for the cell beyond which the welds will fail and break connection to the tab. Such welding, in any number, as desired, may be applied on either electrode (anode or cathode) alone, or on both electrodes simultaneously in identical or different numbers, again, as desired.

In terms of such welding capabilities, there is also the potential (and, at times, need) to ensure such connections between current collector/electrode and tab are reinforced beyond the welds themselves. The possibility of detachment between such components due to weakened welds may compromise the overall power cell capabilities, in other words. To further bolster and enhance the power generation and transfer benefits thereof such a safe (thin current collector) structure, tape, clamp, and possible combinations thereof, may be employed to supplement the welds themselves.

Such lithium ion battery thin films may require certain unique processing steps due to their unique qualities. However, many processing steps that are well known in the art may also be employed. In general, the process to produce a lithium ion battery with the inventive films comprises the steps of:

a. Providing an electrode having at least one metallized substrate with a coating of an ion storage material;

b. Providing a counterelectrode;

c. Layering said electrode and counterelectrode opposite each other with a separator component interposed between said electrode and said counterlectrode;
d. Providing a package material including an electrical contact component, wherein said contact includes a portion present internally within said package material and a portion present external to said package material;
e. Electrically connecting said electrical contact with said metallized substrate;
f. Introducing at least one liquid electrolyte with ions internally within said package material; and
g. Sealing said package material.

The metallized substrate can be any substrate as described within this disclosure.

The ion storage material can for example be a cathode or anode material for lithium ion batteries, as are well known in the art. Cathode materials may include lithium cobalt oxide $LiCoO_2$, lithium iron phosphate $LiFePO_4$, lithium manganese oxide $LiMn_2O_4$, lithium nickel manganese cobalt oxide $LiNi_xMn_yCo_zO_2$, lithium nickel cobalt aluminum oxide $LiNi_xCo_yAl_zO_2$, or mixtures of the above or others as are known in the art. Anode materials may include graphite, lithium titanate $Li_4Ti_5Oi_2$, hard carbon, tin, silicon or mixtures thereof or others as are known in the art. In addition, the ion storage material could include those used in other energy storage devices, such as supercapacitors. In such supercapacitors, the ion storage materials will include activated carbon, activated carbon fibers, carbide-derived carbon, carbon aerogel, graphite, graphene, graphene, and carbon nanotubes. The coating process can be any coating process that is generally known in the art. Knife over-roll and slot die are commonly used coating processes for lithium ion batteries, but others may be used as well, including electroless plating. In the coating process, the ion storage material is in general mixed with other materials, including binders such as polyvinylidene fluoride or carboxymethyl cellulose, or other film-forming polymers. Other additives to the mixture include carbon black and other conducting additives.

Counterelectrodes include other electrode materials that have different electrochemical potentials from the ion storage materials. In general, if the ion storage material is a lithium ion anode material, then the counterelectrode would be made form a lithium ion cathode material. In the case where the ion storage material is a lithium ion cathode material, then the counterelectrode might be a lithium ion anode material. In the case where the ion storage material is a supercapacitor material, the counterelectrode can be made from either a supercapacitor material, or in some cases from a lithium ion anode or lithium ion cathode material. In each case, the counterelectrode would include an ion storage material coated on a current collector material, which could be a metal foil, or a metallized film such as in this invention.

In the layering process, the inventive electrode is layered with the counterelectrode with the electrode materials facing each other and a porous separator between them. As is commonly known in the art, the electrodes may be coated on both sides, and a stack of electrodes formed with the inventive electrode and counterelectrodes alternating with a separator between each layer. Alternatively, as is also known in the art, strips of electrode materials may be stacked as above, and then wound into a cylinder.

Packaging materials may include hard packages such as cans for cylindrical cells, flattened hard cases or polymer pouches. In each case, there must be two means of making electrical contact through the case that can be held at different voltages and can conduct current. In some instances, a portion of the case itself forms one means, while another is a different portion of the case that is electrically isolated from the first portion. In other instances, the case may be nonconducting, but allow two metal conductors to protrude through the case, often referred to as tabs.

Connecting the means to make electrical contact with the metallized substrate can include commonly used methods, such as welding, taping, clamping, stapling, riveting, or other mechanical means. Because the metal of the metallized substrate can be very thin, in order to enable an interface that allows for high current flow, a face-to-face contact is generally required, giving high surface area between the means of making electrical contact through the case and the metallized substrate. To carry sufficient current, this surface area should be higher than 1 square millimeter ($10^{-12}$ square meters) but may need to be higher than 3 square millimeters, or even 5 square millimeters or more preferably 10 square millimeters.

Of course, in addition to face-to-face contact, this weld may include contact by extruding the thin metal layer through the plastic layer to contact metal that was previously on the other side of said plastic layer, which may be in the form of divots created through ultrasonic welding or other method of welding.

The liquid electrolyte is typically a combination/mixture of a polar solvent and a lithium salt. Commonly used polar solvents include, as noted above, propylene carbonate, ethylene carbonate, dimethyl carbonate, diethyl carbonate, but other polar solvents, including ionic liquids or even water may be used. Lithium salts commonly utilized within this industry include, without limitation, $LiPF_6$, $LiPF_4$, $LiBF_4$, $LiClO_4$ and others. The electrolyte may also contain additives as are known in the art. In many cases, the electrolytes can be flammable, in which the safety features of the inventive metallized substrate current collectors can be advantageous preventing dangerous thermal runaway events which result in fire and damage both to the cell and external to the cell.

BRIEF DESCRIPTION OF THE DRAWINGS

FIG. 1 is a Prior Art depiction of the architecture of a wound cell, such as an 18650 cell.

FIG. 2 is a Prior Art depiction of the shrinkage as a function of temperature as measured by Dynamic Mechanical Analysis of several lithium ion battery separators, as measured according to NASA/TM-2010-216099 "Battery Separator Characterization and Evaluation Procedures for NASA's Advanced Lithium Ion Batteries," which is incorporated herein by reference, section 3.5. Included are first generation separators (Celgard PP, Celgard tri-layer), 2nd generation separators (ceramic PE) and 3rd generation separators (Silver, Gold, Silver AR).

DETAILED DESCRIPTION OF THE PREFERRED EMBODIMENTS AND EXAMPLES

The following descriptions and examples are merely representations of potential embodiments of the present disclosure. The scope of such a disclosure and the breadth thereof in terms of claims following below would be well understood by the ordinarily skilled artisan within this area.

As noted above, the present disclosure is a major shift and is counterintuitive from all prior understandings and remedies undertaken within the lithium battery (and other energy storage device) industry. To the contrary, the novel devices described herein provide a number of beneficial results and properties that have heretofore been unexplored, not to mention unexpected, within this area. Initially, though, as comparisons, it is important to note the stark differences involved between prior devices and those currently disclosed and broadly covered herein.

SHORT CIRCUIT EVENT EXAMPLES

Comparative Example 1

Figure 5A:
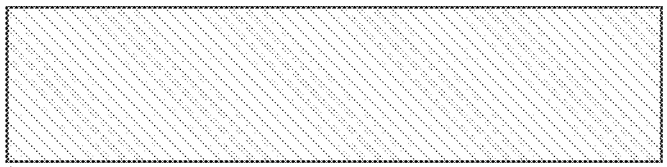
FIG. 5A is a Prior Art depiction of a thick aluminum current collector, generally between 12-20 microns thick.
Figure 6A:
FIGS. 6A and 6B show images of comparative examples 1-2, each after having been touched by the tip of a hot soldering iron. The comparative examples do not change after touching with a hot soldering iron.

A cathode for a lithium iron phosphate battery was obtained from GB Systems in China. The aluminum tab was removed as an example of a commercial current collector, and the thickness, areal density and resistance were measured, which are shown in Table 1, below. The aluminum foil was then touched with a hot soldering iron for 5 seconds, which was measured using an infrared thermometer to have a temperature of between 500 and 525° F. There was no effect of touching the soldering iron to the current collector. The thickness, areal density and resistance were measured. The material was placed in an oven at 175° C. for 30 minutes and the shrinkage measured. A photograph was taken and included in FIG. 6A. FIG. 5A provides a representation of the traditional current collector within such a comparative battery.

Comparative Example 2

Figure 6B:
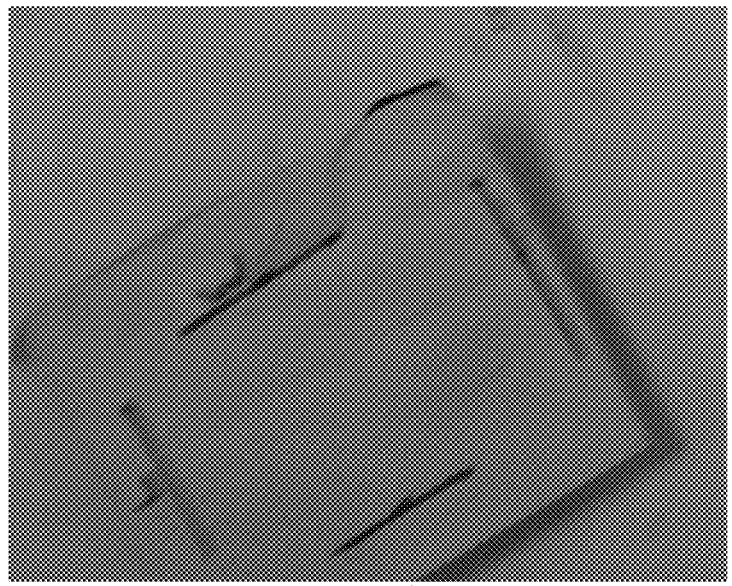

An anode for a lithium iron phosphate battery was obtained from GB Systems in China. The copper tab was removed as an example of a commercial current collector, and the thickness, areal density and resistance were measured, which are shown in Table 1, below. The copper foil was then touched with a hot soldering iron in the same way as Example 1. There was no effect of touching the soldering iron to the current collector. The thickness, areal density and resistance were measured. The material was placed in an oven at 175° C. for 30 minutes and the shrinkage measured. A photograph was taken and included in FIG. 6B. As in Comparative Example 1, FIG. 5A provides a representation of the internal structure of such a battery. The thickness of the current collector is significant as it is a monolithic metal structure, not a thin type as now disclosed.

Example 1

Figure 7A:
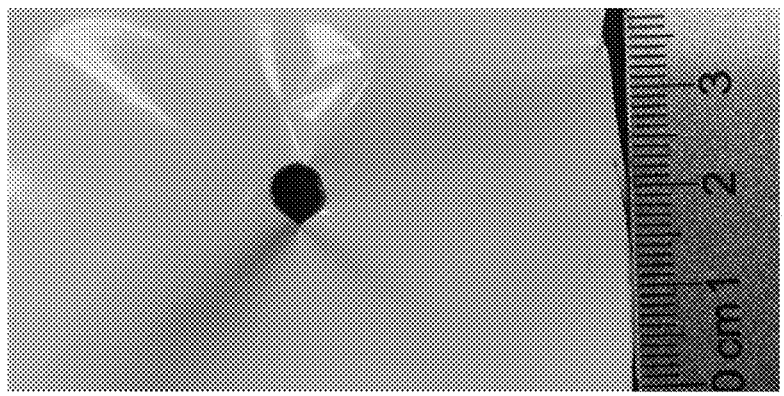
FIGS. 7A, 7B, and 7C show images of examples 1-3, each after having been touched by the tip of a hot soldering iron. The examples 1-3 all exhibit shrinkage as described in this disclosure for substrates to be metalized.

Polypropylene lithium battery separator material was obtained from MTI Corporation. The material was manufactured by Celgard with the product number 2500. The thickness, areal density and resistance were measured, which are shown in Table 1, below. The separator was then touched with a hot soldering iron in the same way as Example 1. Touching the thermometer to the current collector created a small hole. The diameter was measured and included in Table 1. The thickness, areal density and resistance were measured. The material was placed in an oven at 175° C. for 30 minutes and the shrinkage measured. A photograph was taken and included in FIG. 7A.

Example 2

Figure 7B:
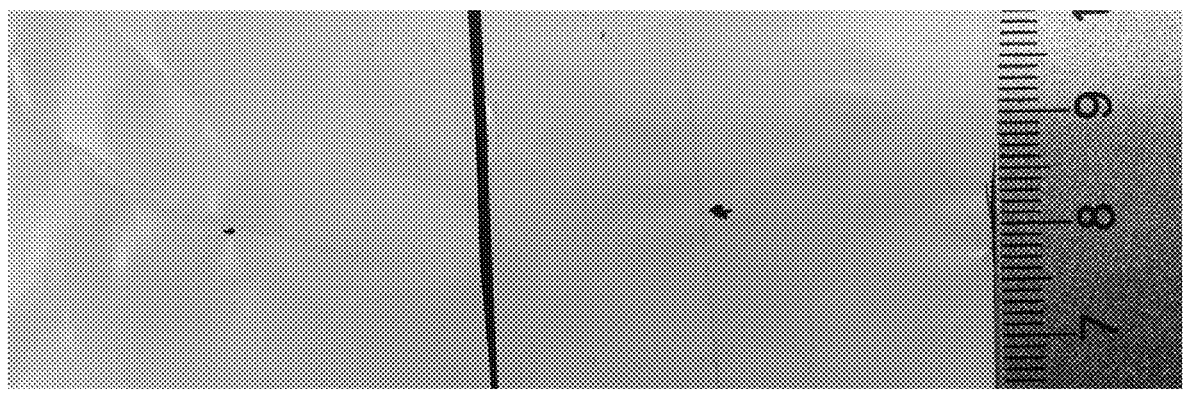

Ceramic coated polyethylene lithium battery separator material was obtained from MTI Corporation. The thickness, areal density and resistance were measured, which are shown in Table 1, below. The separator was then touched with a hot soldering iron in the same way as Example 1. Touching the soldering iron to the current collector created a small hole. The diameter was measured and included in Table 1. The thickness, areal density and resistance were measured. The material was placed in an oven at 175° C. for 30 minutes and the shrinkage measured. A photograph was taken and included in FIG. 7B.

Example 3

Figure 7C:
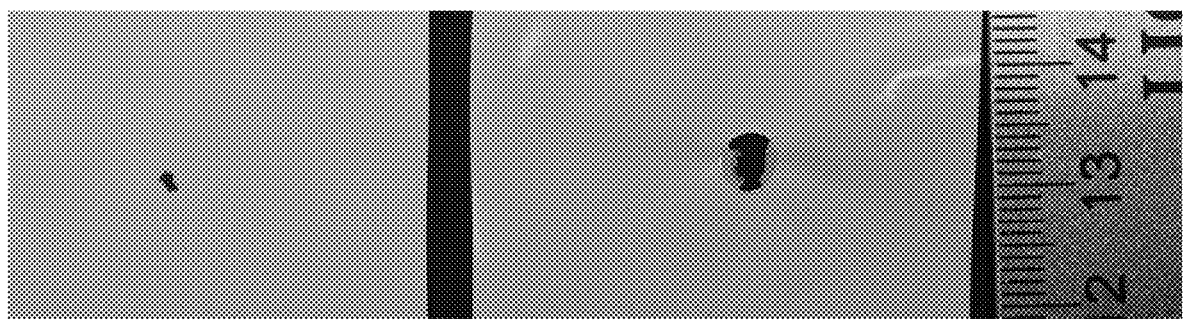

Ceramic coated polypropylene lithium battery separator material was obtained from MTI Corporation. The thickness, areal density and resistance were measured, which are shown in Table 1, below. The separator was then touched with a hot soldering iron in the same way as Example 1. Touching the soldering iron to the current collector created a small hole. The diameter was measured and included in Table 1. The thickness, areal density and resistance were measured. The material was placed in an oven at 175° C. for 30 minutes and the shrinkage measured. A photograph was taken and included in FIG. 7C.

Example 4

Figure 8A:
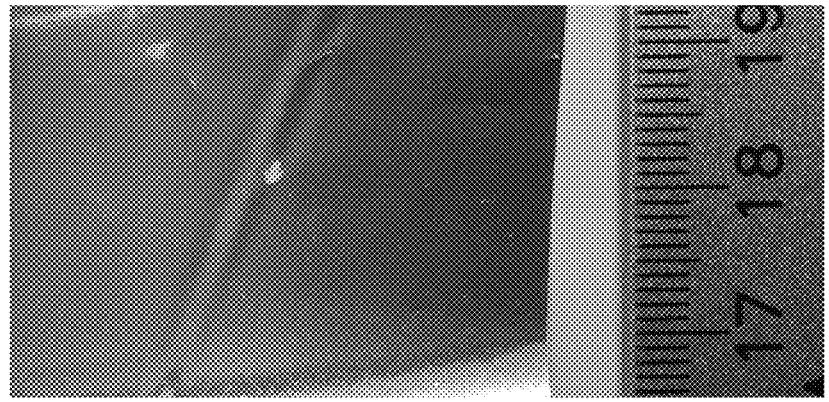
FIGS. 8A, 8B, and 8C show images of examples 4-6, each after having been touched by the tip of a hot soldering iron. The example 4 exhibits shrinkage as described in this disclosure for substrates to be metalized. Example 5 has a fiber that will dissolve under heat in lithium ion electrolytes. Example 6 is an example of a thermally stable substrate that would require a thin conductive layer to function as the current invention.

Aluminized biaxially oriented polyester film was obtained from All Foils Inc., which is designed to be used for helium filled party balloons. The aluminum coating holds the helium longer, giving longer lasting loft for the party balloons. The thickness, areal density and resistance were measured, which are shown in Table 1, below. The film was then touched with a hot soldering iron in the same way as Example 1. Touching the soldering iron to the current collector created a small hole. The diameter was measured and included in Table 1. The thickness, areal density and resistance were measured. The material was placed in an oven at 175° C. for 30 minutes and the shrinkage measured. A photograph was taken and included in FIG. 8A. Compared to the commercially available aluminum current collector of Comparative Example 1, this material is 65% thinner and 85% lighter, and also retreats away from heat, which in a lithium ion cell with an internal short would have the effect of breaking the internal short.

Example 5

Figure 8B:
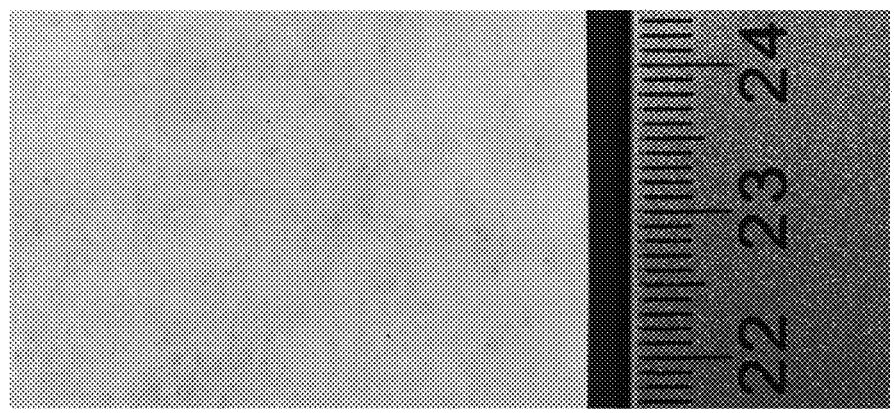

Dreamweaver Silver 25, a commercial lithium ion battery separator was obtained. It is made from a blend of cellulose and polyacrylonitrile nanofibers and polyester microfibers in a papermaking process, and calendered to low thickness. The separator was then touched with a hot soldering iron in the same way as Example 1. Touching the soldering iron to the current collector did not create a hole. The thickness, areal density and resistance were measured. The material was placed in an oven at 175° C. for 30 minutes and the shrinkage measured. Compared to the prior art, comparative examples #3-5, these materials have the advantage that they do not melt or shrink in the presence of heat, and so in a lithium ion battery with an internal short, will not retreat to create an even bigger internal short. Such is seen in FIG. 8B.

Example 6

Figure 8C:
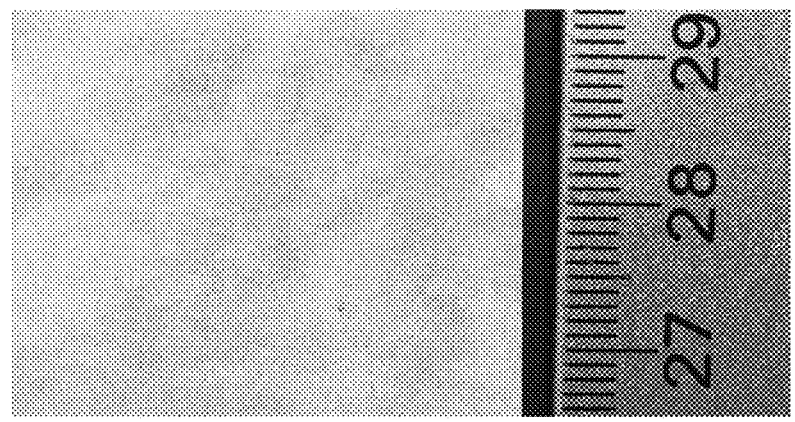

Dreamweaver Gold 20, a commercially available prototype lithium ion battery separator was obtained. It is made from a blend of cellulose and para-aramid nanofibers and polyester microfibers in a papermaking process, and calendered to low thickness. The separator was then touched with a hot soldering iron in the same way as Example 1. Touching the soldering iron to the current collector did not create a hole, as shown in FIG. 8C. The thickness, areal density and resistance were measured. The material was placed in an oven at 175° C. for 30 minutes and the shrinkage measured. The advantages of this separator compared to the prior art separators are the same as for Example 2.

Examples 1-3 are materials that have infinite resistance, have low areal density and melt on exposure to either 175° C. or a hot solder tip. They are excellent substrates for metallization according to this invention.

Example 4 is an example of an aluminized polymer film which shows moderate resistance, low areal density and shrinks when exposed to 175° C. or a hot solder tip. It is an example of a potential cathode current collector composite film according to this invention. In practice, and as shown in further examples, it may be desirable to impart a higher level of metal coating for higher power batteries.

Examples 5-6 are materials that have infinite resistance, have low areal density, but have very low shrinkage when exposed to 175° C. or a hot solder tip. They are examples of the polymer substrate under this invention when the thickness of the metallized coating is thin enough such that the metallized coating will deteriorate under the high current conditions associated with a short. Additionally, the cellulose nanofibers and polyester microfibers will oxidize, shrink and ablate at temperatures far lower than the melting temperatures of the metal current collectors currently in practice.

Example 5 additionally is made from a fiber, polyacrylonitrile, that swells on exposure to traditional lithium ion carbonate electrolytes, which is also an example of a polymer substrate under this invention such that the swelling will increase under heat and create cracks in the metalized coating which will break the conductive path, improving the safety of the cell by eliminating or greatly reducing the uniform conductive path of the current collector on the exposure to heat within the battery.

Example 7

The material utilized in Example 5 was placed in the deposition position of a MBraun Vacuum Deposition System, using an intermetallic crucible and aluminum pellets. The chamber was evacuated to $3 \times 10^{-5}$ mbar. The power was increased until the aluminum was melted, and then the power set so the deposition rate was 3 Angstroms/s. The deposition was run for 1 hour, with four samples rotating on the deposition plate. The process was repeated three times, so the total deposition time was 4 hours. The samples were measured for weight, thickness and resistance (DC and 1 kHz, 1 inch strip measured between electrodes 1 inch apart), which are shown in Table 2 below. Point resistance was also measured using a Hioki 3555 Battery HiTester at 1 kHz with

TABLE 1

| Example | Material | Thickness | Areal Density | Resistance | Shrinkage (175 C.) | Solder Tip Hole Size |
|---------|----------|-----------|---------------|------------|--------------------|----------------------|
| Comp Example 1 | Aluminum | 30 μm | 80 g/m² | <0.1 mOhm/square | 0% | No hole |
| Comp Example 2 | Copper | 14 μm | 125 g/m² | <0.1 mOhm/square | 0% | No hole |
| Example 1 | PP | 24 μm | 14 g/m² | Infinite | Melted | 7.5 μm |
| Example 2 | PP ceramic | 27 μm | 20 g/m² | Infinite | Melted | 2 μm/1 μm |
| Example 3 | PE ceramic | 27 μm | 20 g/m² | Infinite | Melted | 5 μm/2 μm |
| Example 4 | Aluminized PET | 13 μm | 12 g/m² | 6.3 Ohm/square | 33% | 2 μm |
| Example 5 | Fiber blend | 27 μm | 16 g/m² | Infinite | 2% | No hole |
| Example 6 | Fiber blend | 23 μm | 16 g/m² | Infinite | 0% | No hole |

Comparative Examples 1-2 are existing current collector materials, showing very low resistance, high areal density and no response at exposure to either a hot solder tip or any shrinkage at 175° C.

the probe tips 1" apart. The weight of added aluminum was calculated by the weight added during the process divided by the sample area. This is divided by the density of the material to give the average thickness of the coating.

Example 8

A nonwoven polymer substrate was made by taking a polyethylene terephthalate microfiber with a flat cross section and making hand sheets at 20 g/m² using the process of Tappi T206. These hand sheets were then calendered at 10 m/min, 2000 lbs/inch pressure using hardened steel rolls at 250° F. This material was metalized according to the process of Example 7, and the same measurements taken and reported in Table 8.

Example 9

Figure 9A:
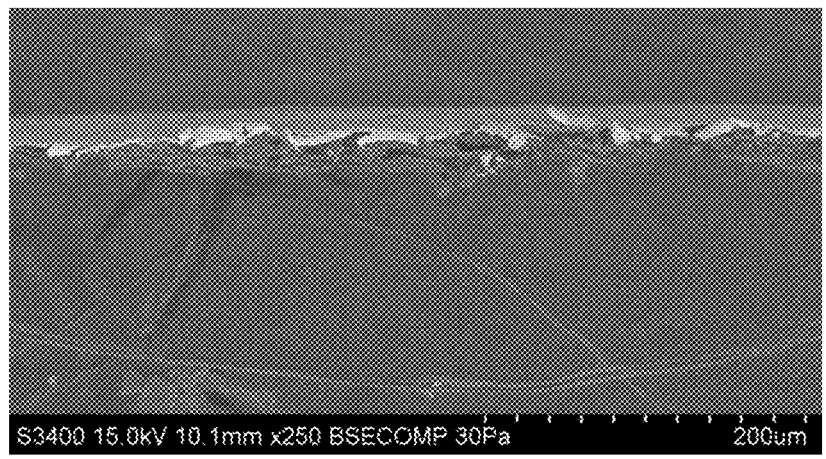
FIGS. 9A, 9B, and 9C are SEMs at different magnifications in cross section and one showing the metalized surface of one possible embodiment of one current collector as now disclosed as described in Example 9. The metal is clearly far thinner than the original substrate, which was 20 microns thick.
Figure 9B:
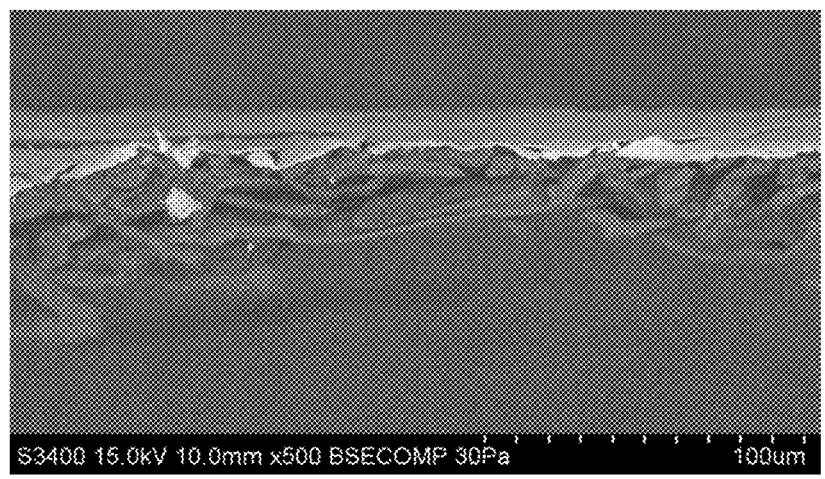
Figure 9C:
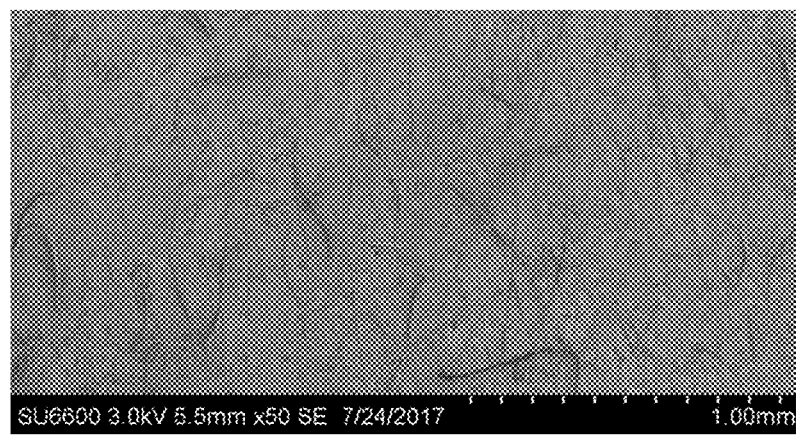

Material according to Example 5 was deposited according to the process of Example 7, except that the coating was done at a setting of 5 Angstroms/second for 60 minutes. The samples were turned over and coated on the back side under the same procedure. These materials were imaged under a scanning electron microscope (SEM), both on the surface and in cross section, and the images are presented in FIGS. 9A, 9B, and 9C.

Example 10

Materials were prepared according to the procedure of Example 9, except the deposition on each side was for only 20 minutes.

Example 11

The polymer substrate of Example 8 was prepared, except that the sheets were not calendered. The deposition of aluminum is at 5 Angstroms/second for 20 minutes on each side. Because the materials were not calendered, the porosity is very high, giving very high resistance values with a thin coat weight. Comparing Example 11 to Example 8 shows the benefits of calendering, which are unexpectedly high.

TABLE 2

| Sample | Added weight | DC Resistance | 1 kHz Resistance | 1 kHz point resistance | Average coating thickness |
|---|---|---|---|---|---|
| Units | g/m² | Ohms/square | Ohms/square | Ohms | microns |
| Example 7 | 3.5 | 0.7 | 0.5 | 0.1 | 1.3 |
| Example 8 | 2.0 | 7 | 7 | 0.4 | 0.7 |
| Example 9 | 2.2 | | | 0.2 | 0.8 |
| Example 10 | 0.8 | | | 1.7 | 0.3 |
| Example 11 | 0.8 | | | 100 | 0.3 |

Example 12

The aluminum coated polymer substrate from Example 9 was coated with a mixture of 97% NCM cathode material (NCM523, obtained from BASF), 1% carbon black and 2% PVDF binder in a solution of N-Methyl-2-pyrrolidone. The coat weight was 12.7 mg/cm2, at a thickness of 71 microns. This material was cut to fit a 2032 coin cell, and paired with graphite anode coated on copper foil current collector (6 mg/cm², 96.75% graphite (BTR), 0.75% carbon black, 1.5% SBR and 1% CMC). A single layer coin cell was made by placing the anode, separator (Celgard 2320) and the NCM coated material into the cell, flooding with electrolyte (60 µL, 1.0M $LiPF_6$ in EC:DEC:DMC=4:4:2 vol+2w. % VC) and sealing the cell by crimping the shell. To obtain adequate conductivity, a portion of the aluminum coated polymer substrate from Example 9 was left uncoated with cathode material and folded over to contact the shell of the coin cell, completing the conductive pathway. The cell was formed by charging at a constant current of 0.18 mA to 4.2 V, then at constant voltage (4.2 V) until the current dropped to 0.04 mA. The cell was cycled three times between 4.2 V and 3.0 V at 0.37 mA, and gave an average discharge capacity of 1.2 mAh.

Example 13

A cell was made according to the procedure and using the materials from Example 12, except the separator used was Dreamweaver Silver 20. The cell was formed by charging at a constant current of 0.18 mA to 4.2 V, then at constant voltage (4.2 V) until the current dropped to 0.04 mA. The cell was cycled three times between 4.2 V and 3.0 V at 0.37 mA, and gave an average discharge capacity of 0.8 mAh. Thus in this and the previous example, working rechargeable lithium ion cells were made with an aluminum thickness of less than 1 micron.

Comparative Example 3

Figure 10A:
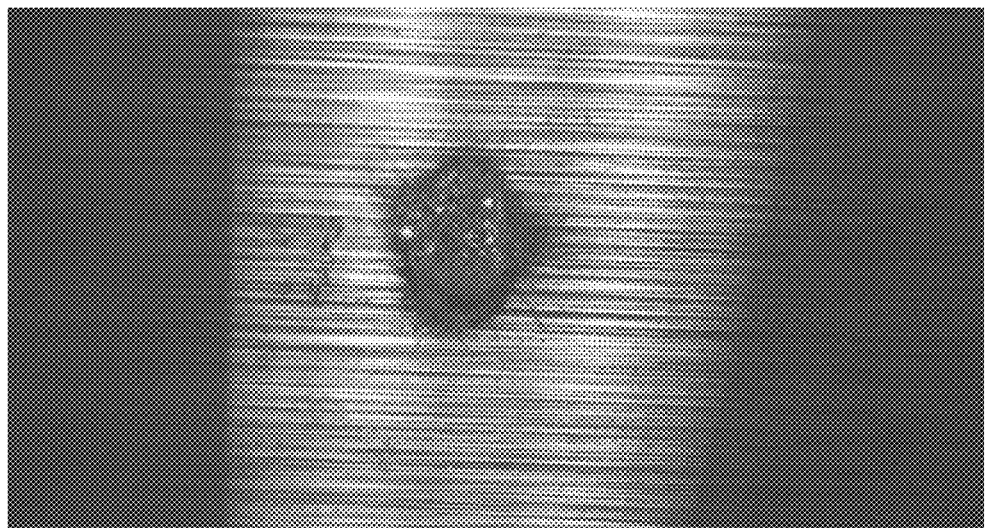
FIGS. 10A and 10B are optical micrographs of a Comparative Examples 3 and 4 after shorting, showing ablation of the area around the short but no hole.

The aluminum tab of Comparative Example 1, approximately 2 cm×4 cm was connected to the ground of a current source through a metal connector contacting the entire width of the sample. The voltage limit was set to 4.0 V, and the current limit to 1.0 A. A probe connected to the high voltage of the current source was touched first to a metal connector contacting the entire width of the sample, and then multiple times to the aluminum tab, generating a short circuit at 1.0 A. The tip of the probe was approximately 0.25 mm² area. When contacted across the entire width, the current flowed normally. On initial touch with the probe to the tab, sparks were generated, indicating very high initial current density. The resultant defects in the current collector only sometimes resulted in holes, and in other times there was ablation but the current collector remained intact. In all cases the circuit remained shorted with 1.0 A flowing. A micrograph was taken of an ablated defect, with no hole, and is shown in FIG. 10A. The experiment was repeated with the current source limit set to 5.0, 3.0, 0.6 A, 0.3 A and 0.1 A, and in all cases the result was a continuous current at the test current limit, both when contacted across the entire width of the current collector and using the point probe of approximately 0.25 mm² tip size.

Comparative Example 4

Figure 10B:

The copper tab of Comparative Example 2 of similar dimensions was tested in the same way as Comparative Example 3. When contacted across the entire width, the current flowed normally. On initial touch with the probe to the tab, sparks were generated, indicating very high initial current density. The resultant defects in the current collector only sometimes resulted in holes, and in other times there was ablation but the current collector remained intact. In all cases the circuit remained shorted with 0.8 A flowing. A micrograph was taken of an ablated defect, with no hole, and is shown in FIG. 10B. The experiment was repeated with the current source limit set to 5.0, 3.0, 0.6 A, 0.3 A and 0.1 A, and in all cases the result was a continuous current at the test current limit, both when contacted across the entire width of the current collector and using the point probe of approximately 0.25 mm² tip size.

Example 14

Figure 11A:
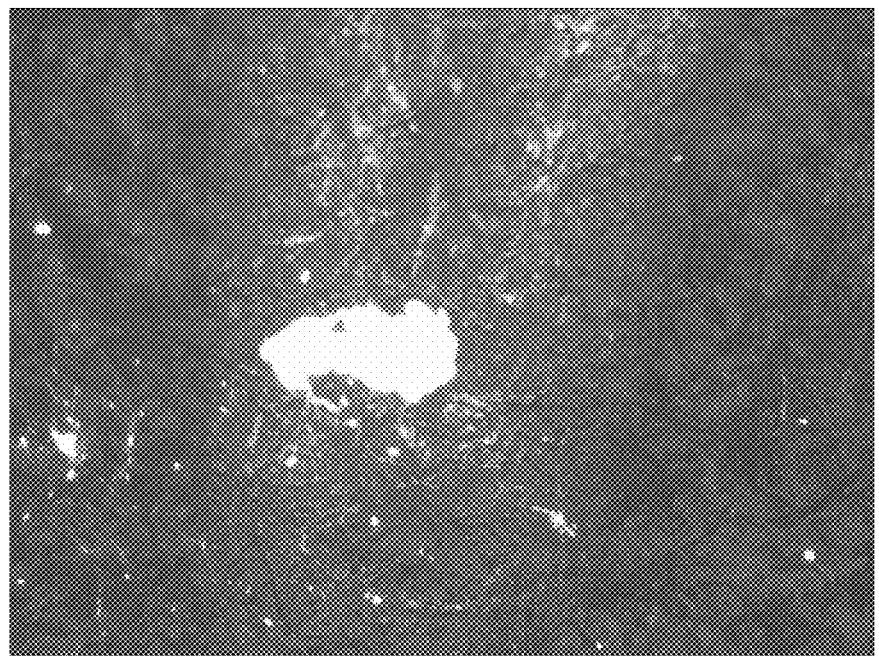
FIGS. 11A and 11B are optical micrographs of two areas of Example 14 after shorting, showing clear holes in the material caused by the high current density of the short.
Figure 11B:
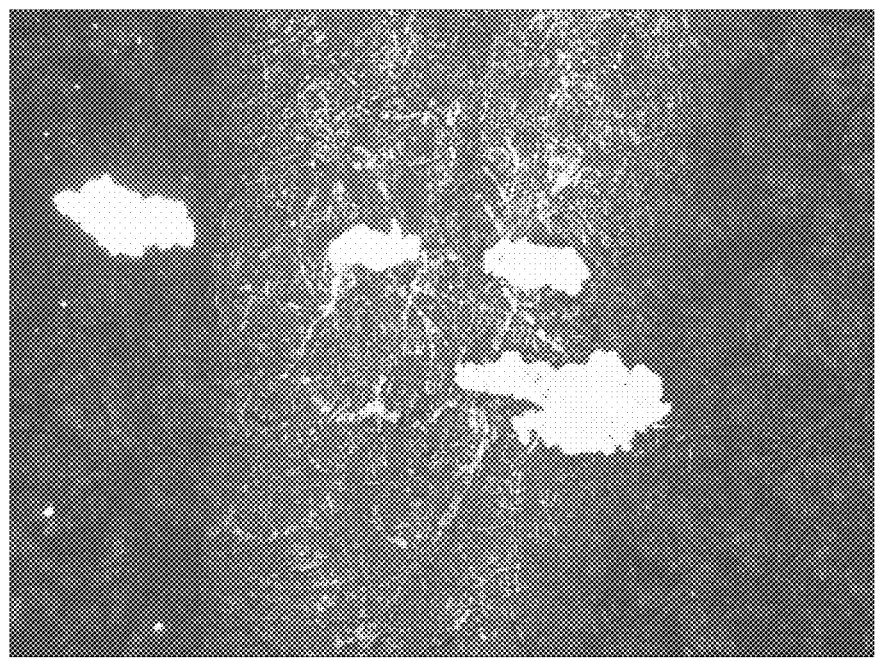

The inventive aluminum coated polymer substrate material of Example 7 of similar dimensions was tested using the same method as Comparative Examples 3-4. When contacted across the entire width, the current flowed normally. In each case of the touch of the probe to the inventive current collector directly, the sparks generated were far less, and the current ceased to flow after the initial sparks, leaving an open circuit. In all cases, the resultant defect was a hole. Micrographs of several examples of the holes are shown in FIGS. 11A and 11B. The experiment was repeated with the current source limit set to 5.0, 3.0, 0.6 A, 0.3 A and 0.1 A, and in all cases the result a continuous flow of current when contacted through the full width connectors, and no current flowing through the inventive example when contacted directly from the probe to the inventive current collector example.

The key invention shown is that, when exposed to a short circuit as in Comparative Examples 3-4 and in Example 14, with the prior art the result is an ongoing short circuit, while with the inventive material the result is an open circuit, with no ongoing current flowing (i.e., no appreciable current movement). Thus, the prior art short circuit can and does generate heat which can melt the separator, dissolve the SEI layer, and result in thermal runaway of the cell, thereby igniting the electrolyte. The open circuit of the inventive current collector will not generate heat and thus provides for a cell which can support internal short circuits without allowing thermal runaway and the resultant smoke, heat and flames.

Examples 15 and 16 and Comparative Examples 5 and 6

Figure 3A:
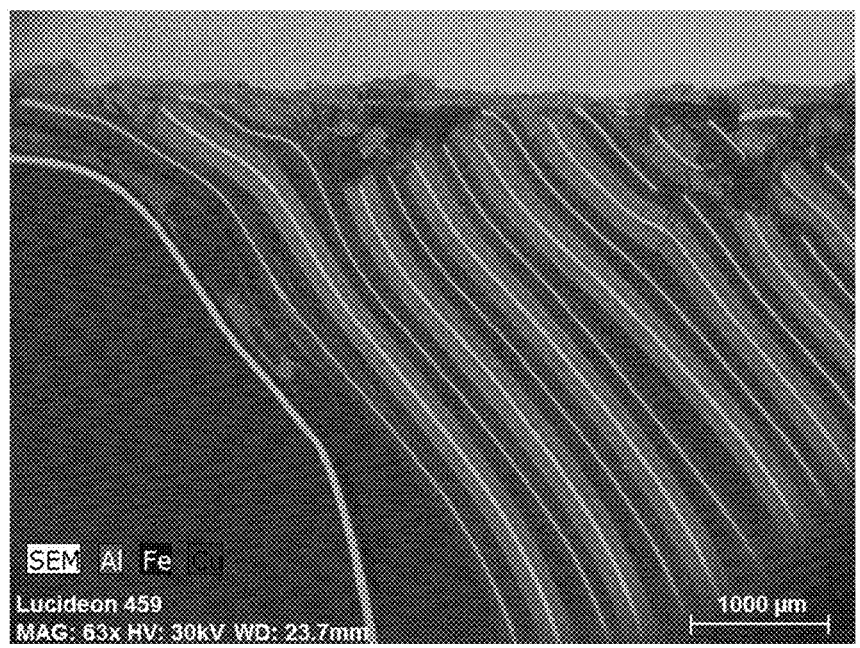
FIG. 3A is a Prior Art depiction of a scanning electron micrograph (SEM) of the cross section of a pouch cell that has undergone a nail penetration test. The layers are aluminum and copper as mapped by BEI (backscattered electron imaging). The nail is vertical on the left side. In each case, the aluminum layer has retreated from the nail, leaving behind a "skin" of aluminum oxide, an insulator.
Figure 3B:
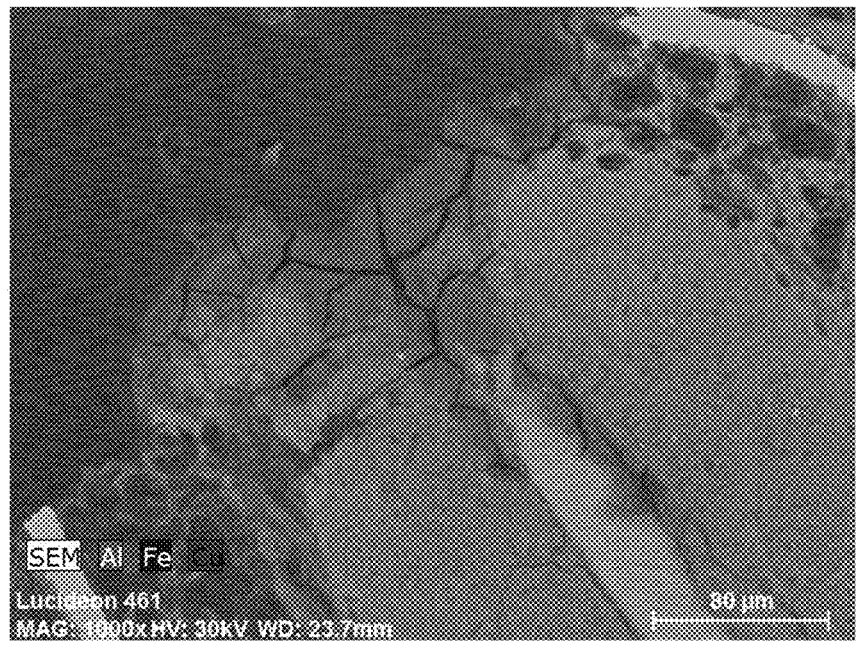
FIG. 3B is a Prior Art depiction of a zoom in on one of the layers from the image shown in FIG. 3A. It shows a close up of the aluminum oxide layer, and also reveals that the separator had not shrunk at all and was still separating the electrodes to the very edge.
Figure 4:
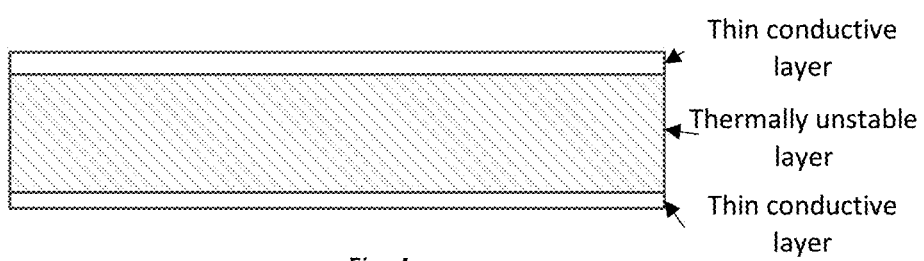
FIG. 4 is a depiction of the metallized film used in the current invention, where the thin layer of conductive material is on the outside, and the center substrate is a layer that is thermally unstable under the temperatures required for thermal runaway. This substrate can be a melting layer, a shrinking layer, a dissolving layer, an oxidizing layer, or other layer that will undergo a thermal instability at a temperature between 100° C. and 500° C.
Figure 5B:
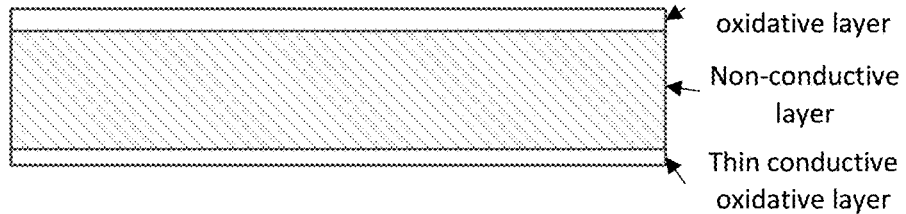
FIG. 5B is a depiction of the metallized film used in the current invention, showing a micron thick substrate with 1 micron of aluminum on each side. In the case of the inventive current collector, it is not capable of carrying the high currents associated with a short circuit, while the thick current art is and does.

Two metallized films were produced on 10 micron polyethylene terephthalate film in a roll to roll process. In this process, a roll of the film was placed in a vacuum metallization production machine (an example of which is TopMet 4450, available from Applied Materials), and the chamber evacuated to a low pressure. The roll was passed over heated boats that contain molten aluminum at a high rate of speed, example 50 m/min. Above the heated boats containing molten aluminum is a plume of aluminum gas which deposits on the film, with the deposition rate controlled by speed and aluminum temperature. A roll approximately 500 m long and 70 cm wide was produced through multiple passes until the aluminum coating was ~300 nm. The coating process was repeated to coat the other side of the film, with the resultant product utilized herein as Example 15 (with the inventive current collector of FIG. 4 a depiction of that utilized in this Example). Example 16 was thus produced in the same way, except the metal in the boat was copper (and with the depiction of FIG. 5B representing the current collector utilized within this inventive structure). The basis weight, thickness and conductivity of each film were measured, and are reported below in Table 3. The coating weight was calculated by subtracting 13.8 g/m², the basis weight of the 10 micron polyethylene terephthalate film. The "calculated coating thickness" was calculated by dividing the coating weight by the density of the materials (2.7 g/cm³ for aluminum, 8.96 g/cm³ for copper), and assuming equal coating on each side. Comparative Example 5 is a commercially obtained aluminum foil 17 microns thick. Comparative Example 6 is a commercially obtained copper foil 50 microns thick. Comparative Example 7 is a commercially obtained copper foil 9 microns thick.

TABLE 3

| Sample | Basis Weight | Coating Weight | Thickness | DC Resistance | Calculated coating thickness |
|---|---|---|---|---|---|
| Units | g/m² | g/m² | Microns | Ohms | microns |
| Example 15 | 17 | 3 | 11 | 0.081 | 0.5 |
| Example 16 | 24 | 10 | 11 | 0.041 | 0.5 |
| Comparative Example 5 | 46 | | 17 | | |
| Comparative Example 6 | 448 | | 50 | | |
| Comparative Example 7 | 81 | | 9 | | |

Example 15, Example 16, Comparative Example 5 and Comparative Example 6 were subjected to a further test of their ability to carry very high current densities. A test apparatus was made which would hold a polished copper wire with radius 0.51 mm (24 AWG gauge) in contact with a current collector film or foil. The film or foil under test was grounded with an aluminum contact held in contact with the film or foil under test, with contact area >1 square centimeter. The probe was connected in series with a high power 400 W resistor of value 0.335 ohms, and connected to a Volteq HY3050EX power supply, set to control current. The current collector to be measured was placed in the setup, with the polished wire in contact with the surface of the current collector at zero input current. The current was increased in 0.2 ampere increments and held at 30 seconds for each increment, while the voltage across the resistor was measured. When the voltage dropped to zero, indicating that current was no longer flowing, the sample was shown to fail. Each of Example 15, Example 16, Comparative Example 5 and Comparative Example 6 were tested. Example 15 failed at a 7 A (average of two measurements). Example 16 failed at 10.2 A (average of two measurements). Neither of Comparative Example 5 nor Comparative Example 6 failed below 20 A. Both Example 15 and Example 16 showed holes in the current collector of radius >1 mm, while neither of the Comparative Examples 5 or 6 showed any damage to the foil. In this example test, it would be advantageous to have a current collector that is unable to carry a current of greater than 20 A, or preferably greater than 15 A or more preferably greater than 12 A.

Figure 12:
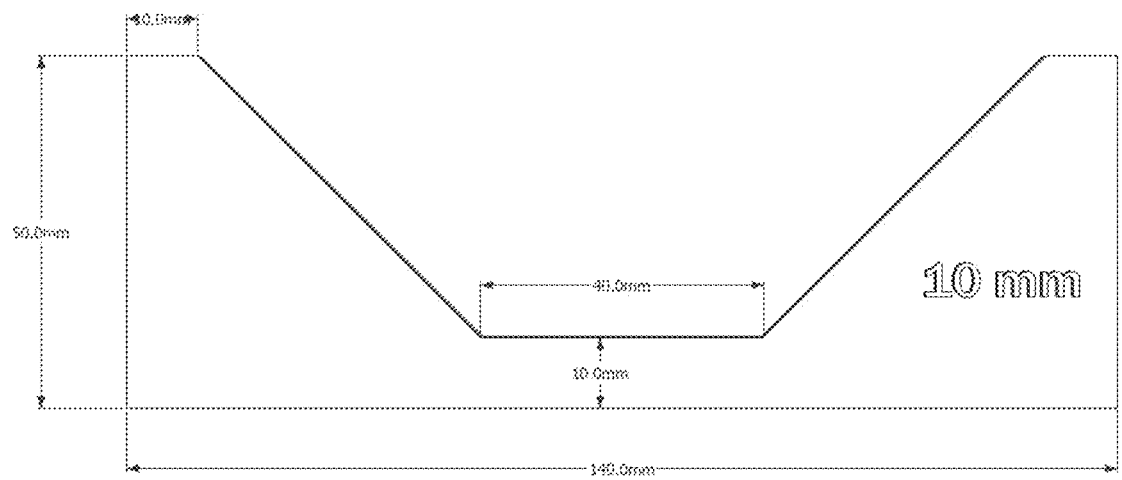
FIG. 12 shows a depiction of the size and shape of a test strip for testing the current carrying capacity of the current collector utilized for Examples noted below.

In another test, meant to simulate using these inventive current collectors as a tab connecting the electrode stack of a cell to the electrical devices in use (either inside or outside the cell), Examples 15 and 16 and Comparative Examples 5 and 6 were subjected to a current capacity test along the strip. To prepare the samples for the test, the current collectors were cut into the shape shown in FIG. 12, which consists of a strip of material that is four centimeters by on centimeter (4 cm×1 cm), with the ends of the strip ending in truncated right isosceles triangles of side 4 cm. Each of the triangles of the test piece was contacted through a piece of aluminum with contact surface area >1 cm. One side was connected through a 400 W, 0.335 ohm resistor, and this circuit was connected to a Volteq HY3050EX power supply. The voltage was measured across the resistors to measure the current, and the piece was shown to fail when this voltage dropped to zero. For each test, the piece was connected with the power supply set to zero current, and then increased in 0.2 A increments and allowed to sit for 30 seconds at each new voltage, until the sample failed and the current flowing dropped to zero. The test was configured so that the metallized current collectors could be measured with contact either on one side, or on both sides of the metallized current collector. The currents at failure are shown below in Table 4. For materials tested in a 4 cm×1 cm strip, it would be advantageous to provide an internal fuse by limited the amount of current that can flow to be below 20 A, or preferably below 15 A, or more preferably below 10 A, each with either single or double-sided contact.

TABLE 4

| Sample | Single Sided Failure Voltage | Double Sided Failure Voltage |
|---|---|---|
| Units | V | V |
| Example 15 | 2.7 | 4.5 |
| Example 16 | 24 | 10 |
| Comparative Example 5 | No failure below 20 A | No failure below 20 A |
| Comparative Example 6 | No failure below 20 A | No failure below 20 A |

Examples 17—19 and Comparative Example 8

Cells were made by coating standard foil current collectors and the metallized PET film current collectors from Examples 15 and 16 with electrode materials. NMC 523 cathode materials were prepared using BASF NMC523 (97%), carbon black (2%) and PVDF (1%) in NMP solvent, and coated on the aluminum current collector (15 micron aluminum current collector) and Example 15 were at a basis weight of 220 g/m$^2$, corresponding to a cathode loading density of 3.3 mAh/cm$^2$. Anode materials were prepared by using graphite BTR-918S (94%), carbon black (5%) and PVDF (1%) in NMP solvent, and coating on the copper current collector (18 micron copper current collector) at 118 g/m$^2$, corresponding to an anode loading density of 4.0 mAh/cm$^2$. Four double sided cathodes were prepared, and three double sided anodes and two single sided anodes. These were stacked with Celgard 2500 separator to form small pouch cells, which were then filled with electrolyte and sealed with designed capacity 1 Ah. Four types of cells were made by different combinations of foil materials, and the capacity measured at C/10 and C/5 (that is, 0.1 A and 0.2 A). The cells were formed by charging at 100 mA to 4.2 V, and held at 4.2 V until the current dropped to 10 mA. The fully formed cells were then weighed, and tested for capacity by discharging at C/10, then charging at C/10 and discharging at C/5. These results are shown in Table 5, below.

TABLE 5

| Sample | Cathode Current Collector | Anode Current Collector | Cell Weight | C/10 Capacity | C/5 Capacity |
|---|---|---|---|---|---|
| Units | | | Grams | mAh | mAh |
| Comparative Example 8 | Al Foil | Cu Foil | 27 | 924 | 615 |
| Example 17 | Example 15 | Cu Foil | 26.8 | 1049 | 751 |
| Example 18 | Al Foil | Example 16 | 24.7 | 1096 | 853 |
| Example 19 | Example 15 | Example 16 | 24.7 | 1057 | 848 |

Thus, it has been shown that the Examples provided above exhibit the desirable thickness, metal coating, and conductivity results needed to prevent thermal runaway within an electrolyte-containing battery, thereby providing not only a much safer and more reliable type, but one that requires far less internal weight components than ever before, without sacrificing safety, but, in fact, improving thereupon.

As noted above, the ability to not only provide such a thin current collector (as an internal fuse within a lithium battery article) but also the necessary benefits of a tabbed structure to ensure generated voltage is transferred external of the subject battery cell, is accorded within this disclosure. Additionally, the ability to further utilize the beneficial thin structures of the current collector as above lends itself to any number of myriad configurations within the confines of the subject battery article itself, potentially generating cumulative power levels all with the beneficial internal fuse component(s) in place. Such are discussed in greater detail within FIGS. 12-22.

Figure 13:
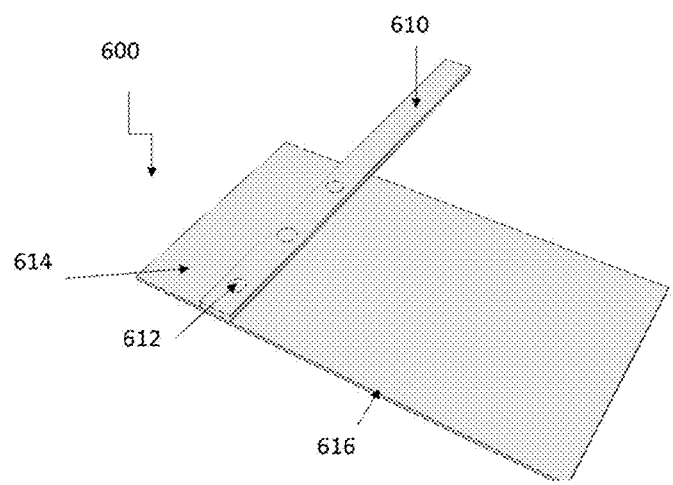
FIG. 13 depicts a side perspective view of a single layer current collector with welded tab as one potentially preferred embodiment.
Figure 14:
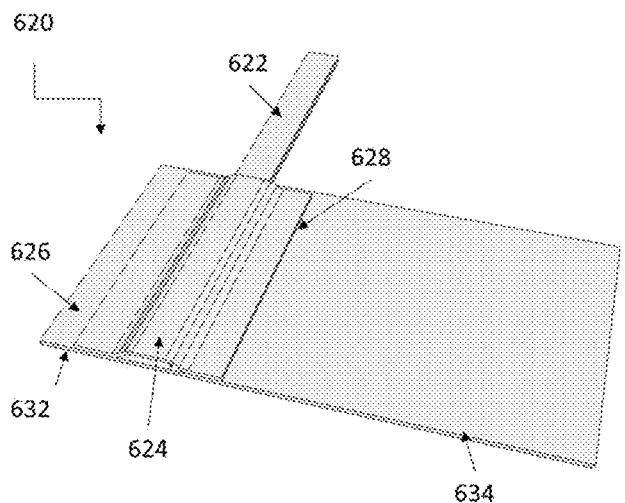
FIG. 14 depicts a side perspective view of a single layer current collector with taped tab as another potentially preferred embodiment.
Figure 15:
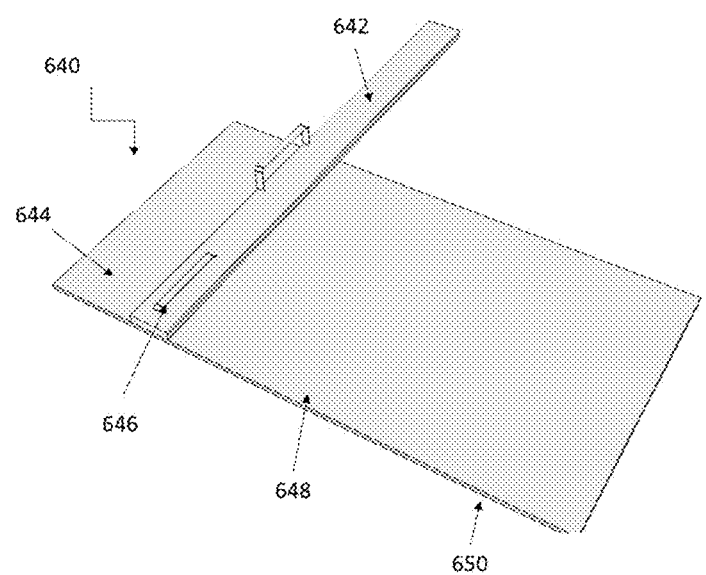
FIG. 15 depicts a side perspective view of a single layer current collector with stapled tab as another potentially preferred embodiment.

FIG. 13 shows a single thin film current tab/collector 600 with a metallized film layer 614 and a lower non-metal layer 616. A conducting tab 610 (to lead to the external power transfer component of a battery) is provided as well, aligned perpendicularly to the collector, and connected thereto with welds 612. FIG. 14 shows a similar current collector 620 but with a tab 622 present with tape 624 connecting the tab 622 to the collector 634 for such a conductive purpose. As above, the tab/current collector 620 has a metallized film layer 626 and a lower non-metal layer 632. The tape component 622 is provided on the outer surface 628 of the tab and leading to the non-metal layer 626 of the current collector, provided a shear strength adhesive quality for the tab to remain secured and in suitable manner for conduction purposes. FIG. 15 provides a different tab/collector 640 showing a different manner of connecting a tab 642 to a single thin current collector 648 (with a metallized film layer 644 and a lower non-metal layer 650), connecting the two components through the utilization of conducting staple components 646.

Figure 16:
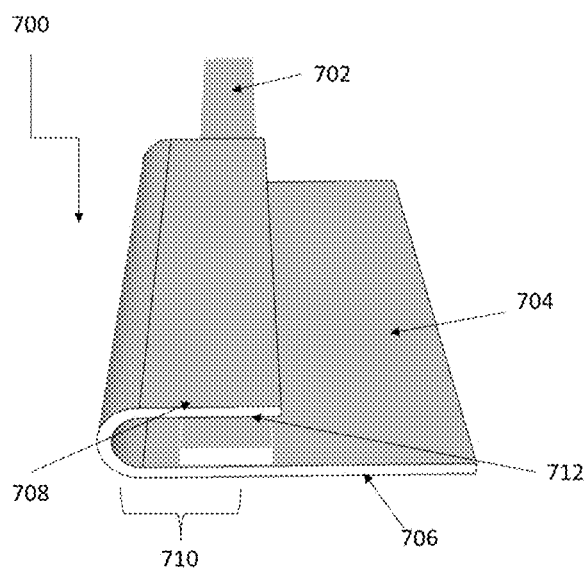
FIG. 16 depicts a side perspective view of a single layer current collector with a single rounded fold therein and a taped tab as another potentially preferred embodiment.
Figure 17:
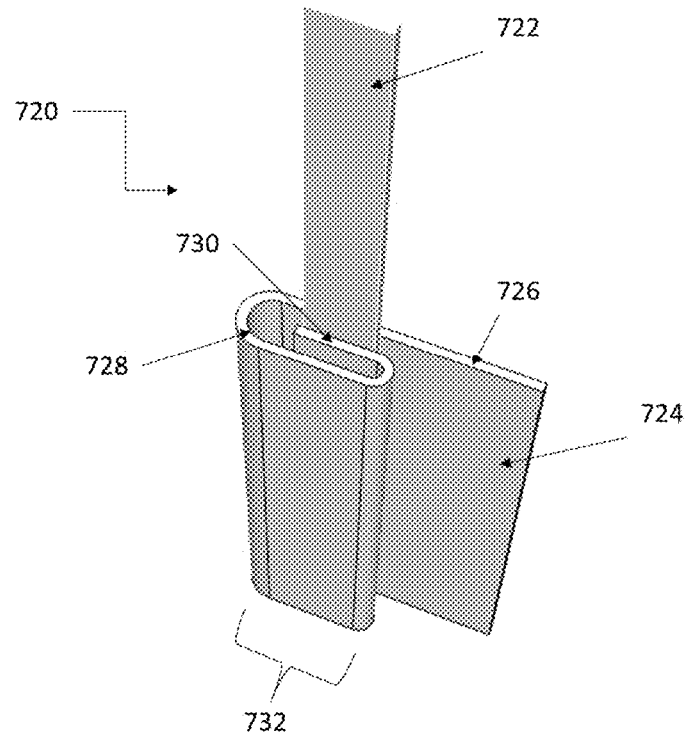
FIG. 17 depicts a side perspective view of a single layer current collector with a double rounded fold therein and a taped tab as another potentially preferred embodiment.
Figure 18:
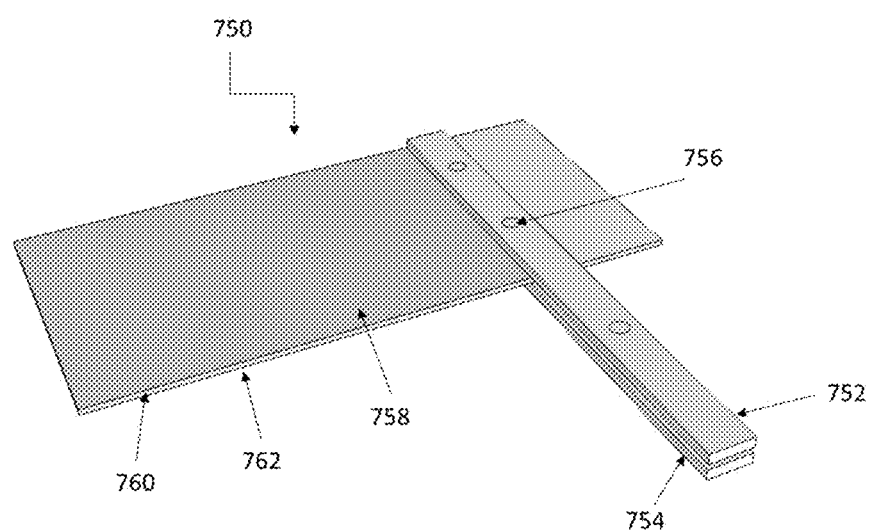
FIG. 18 depicts a side perspective view of a single layer current collector with two parallel welded tabs as another potentially preferred embodiment.
Figure 19:
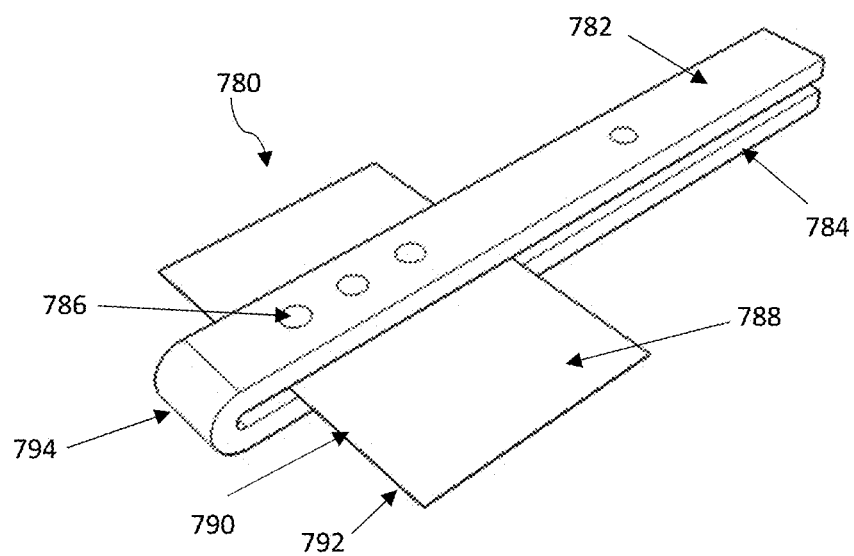
FIG. 19 depicts a side perspective view of a single layer current collector with a single folded welded tab as another potentially preferred embodiment.

FIG. 18 likewise includes a flat tab/current collector 750 with the same type of upper 758 and lower surface 762 as above. The tab 752, 754, in this instance, is provided as two parallel structures with contact with both the top 758 and lower surfaces 760 of the current collector 762. Such a tab 752, 754 includes welds 756 for connection to and with both surfaces 758, 760. FIG. 17 shows a similar structure 780 to FIG. 16, but with a single folded tab 794 in place that is in contact with both surfaces 788, 790 of the current collector 792 through welds 786 with two extended prongs 782, 784 of the folded tab 794 leading therefrom.

Figure 20:
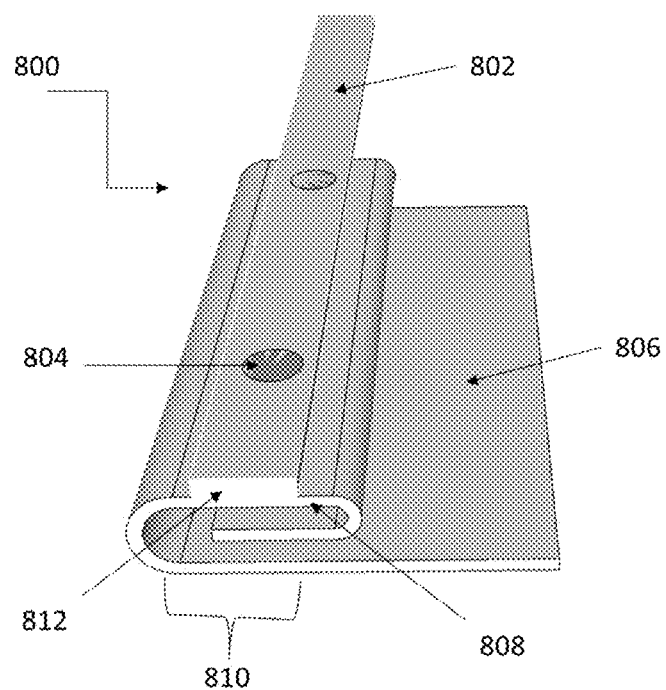
FIG. 20 depicts a side perspective view of a single layer current collector with a double rounded fold therein and a welded tab as another potentially preferred embodiment.
Figure 21:
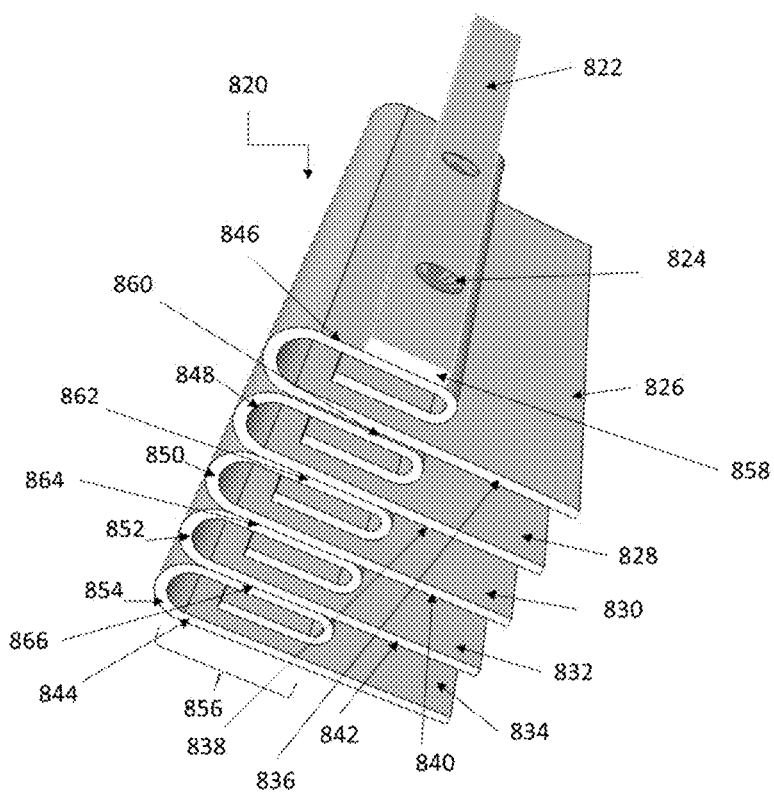
FIG. 21 depicts a side perspective view of a plurality of single layer current collectors each with a double rounded fold therein and a welded tab as another potentially preferred embodiment.
Figure 22:
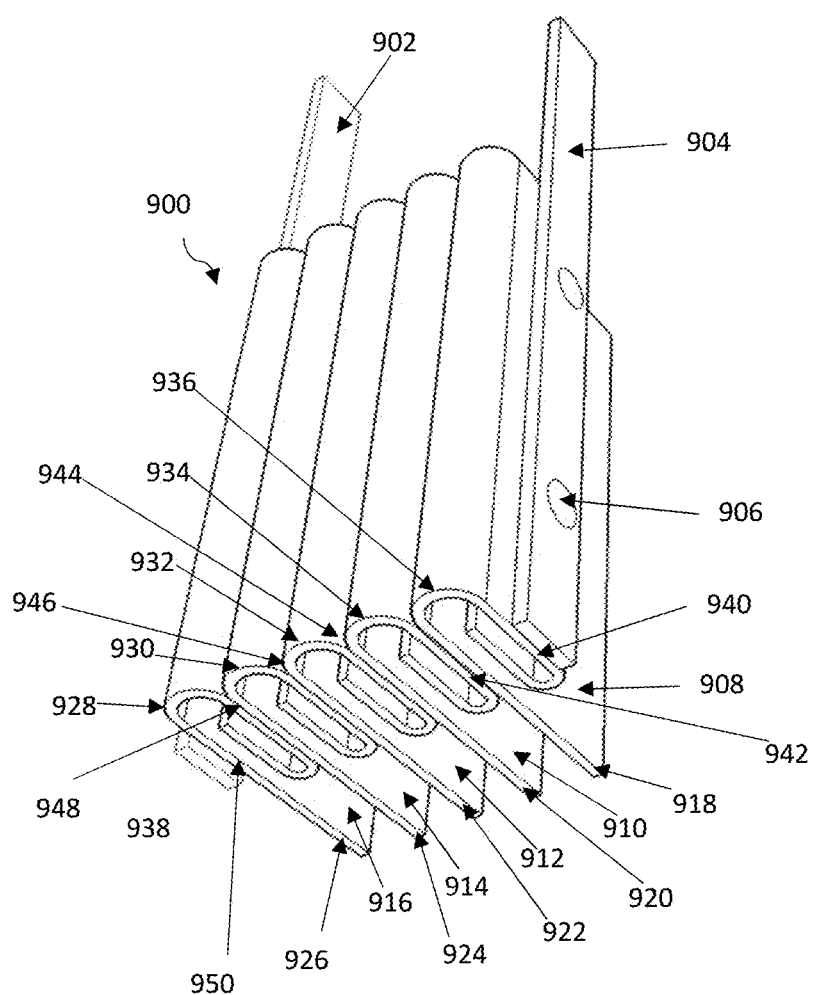
FIG. 22 depicts a side perspective view of a plurality of single layer current collectors each with a double rounded fold therein and two opposing welded tabs as another potentially preferred embodiment.
Figure 23:
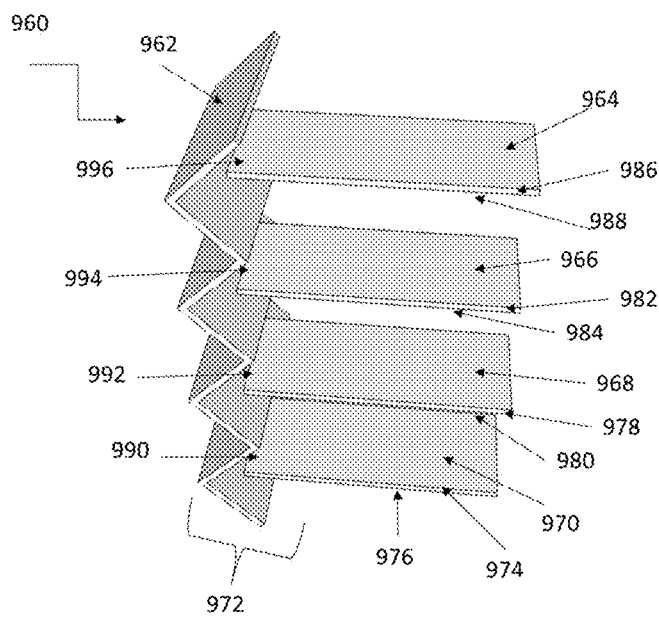
FIG. 23 depicts a side perspective view of a plurality of single layer current collectors in contact with a multiple Z-folded clamped tab as another potentially preferred embodiment.

Such flat current collector structures allow for a typical battery structure with a compact battery structures (such as in FIG. 1, for instance). FIG. 16 shows a single fold 710 tab/current collector 700 with a single taped tab 702 attached thereto the metallized film surface 712 (which covers, as above, the non-metal layer 708). In this manner, the single fold 710 current collector 704 imparts the capability of an increase in power generation within the battery cell as a result, albeit with the need for a slight increase in battery size from the flat structure. FIG. 17 depicts a double folded 732 tab/current collector 720 utilizing the same thin structure collector 724. Such a double fold 732 thus further provides the ability to connect the two sides 726, 728 of the current collector 724 that might otherwise be electrically insulated by the polymer film situated between the two electrically conducting layers. The tab 722 attaches at the collector surface 730 for such a double fold 732 conductivity purpose. FIG. 20 shows a welded 804 tab 802 to a double folded 810 tab/current collector 800, thus exhibiting the same ability to connect electrically isolated layers 808, 812 as above as part of the collector 806, but with safer welds 804 in place to more reliably and more potentially effective for power transfer purposes. FIG. 21 thus shows a composite tab/multiple collectors structure 820 with a plurality (here five)

of such double rounded folded 856 current collectors 826, 828, 830, 832, 834 with metallized film layers 858, 860, 862, 864, 866 and lower non-metal layers 846, 848, 850, 852, 854, connected in a series for even more ability to connect electrically isolated layers for conductivity through a single tab 822 with welds 824 connecting for conductance with the top double rounded folded collector 826. The welded tab 822 stays in place strongly for improved reliability purposes, as well. A second, opposite, welded 906 tab 904 is provided in FIG. 22 with such a multiple multi rounded fold 938 current collector array 908, 910, 912, 914, 916 in place, as well. Such a tabs/collectors structure 900 allows for increased power generation without necessitating weight of volume increases for the subject battery cell through the two tabs 902, 904 configured and connected with the two outer collectors 908, 916, as noted previously. Metallized film layers 940, 942, 944, 946, 948 are, as above, provided with opposing non-metal layers 928, 930, 932, 934, 936 are present as with such other collector examples. Lastly, as yet another non-limiting example tab/collector structure 960, a multi-Z-fold 972 tab 962 clamped to a series of parallel flat thin current collectors 964, 966, 968, 970 (here four)(as described above), with metallized film layers 974, 978, 982, 986 and lower non-metal layers 976, 980, 982, 984, again, to provide a different manner of generating cumulative power in a series, albeit with flat thin current collectors 964, 966, 968, 970 (acting as multiple internal fuses).

Such structures of FIGS. 13-23 thus allow for different external connections to the internal fuse components of a standing lithium battery.

Figure 24:
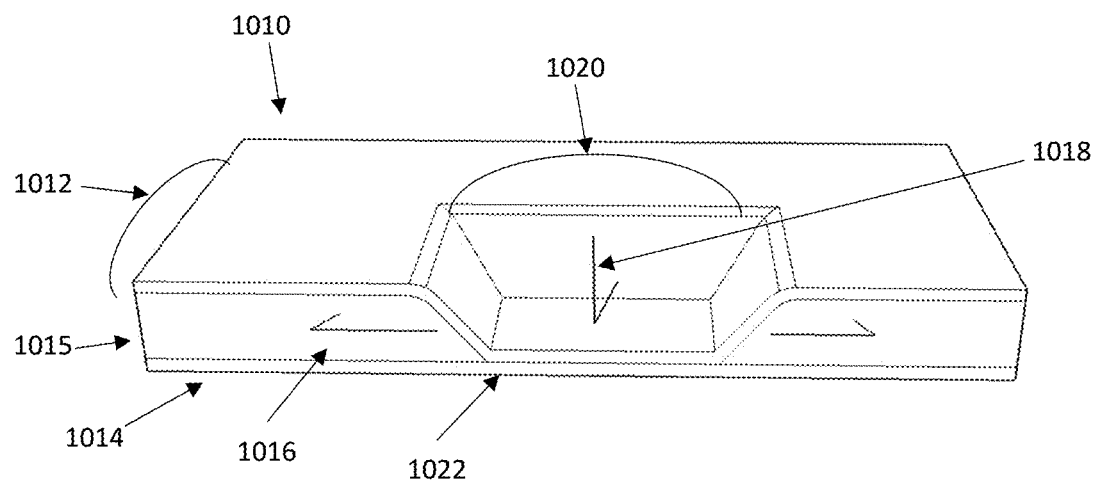
FIG. 24 depicts a front perspective view of a composite current collector having a polymer substrate with two separate layers of metallized film and a single weld present.

FIG. 24 shows a single-welded composite of a thin film current collector 1010 having a middle polymer substrate 1015 and a top metallized film 1012, a bottom metallized film 1014, a weld divot 1020 with a weld direction 1018 indicated, and an interface 1022 of the top 1012 and bottom metallized films 1014. The polymer substrate 1015 has been manipulated outwardly from the weld divot 1020 to allow for the interface 1022 connection between top 1012 and bottom 1014 metallized films. Careful control of the welding parameters are needed to move the polymer without also destroying the metal, in general using less power and more pressure. While exact power and pressure must be determined experimentally based on the exact configuration of welding nodes, metal layer thickness, polymer thickness and metal and polymer material types, it is generally true that less power and more pressure than for a pure metallic weld will yield the desired configuration as shown in this and other figures in this disclosure. FIG. 24 shows the profile of a single ideal node. In practice, many nodes will be present and can be configured with different cross sections and node configurations as depicted in FIGS. 34, 35, 35A, 36, and 37. The desirable effect is to maximize the interface 1022 by varying the node geometry and processing parameters such as power, frequency and pressure, if for ultrasonic welding, or temperature and pressure if for thermal welding.

Figure 25:
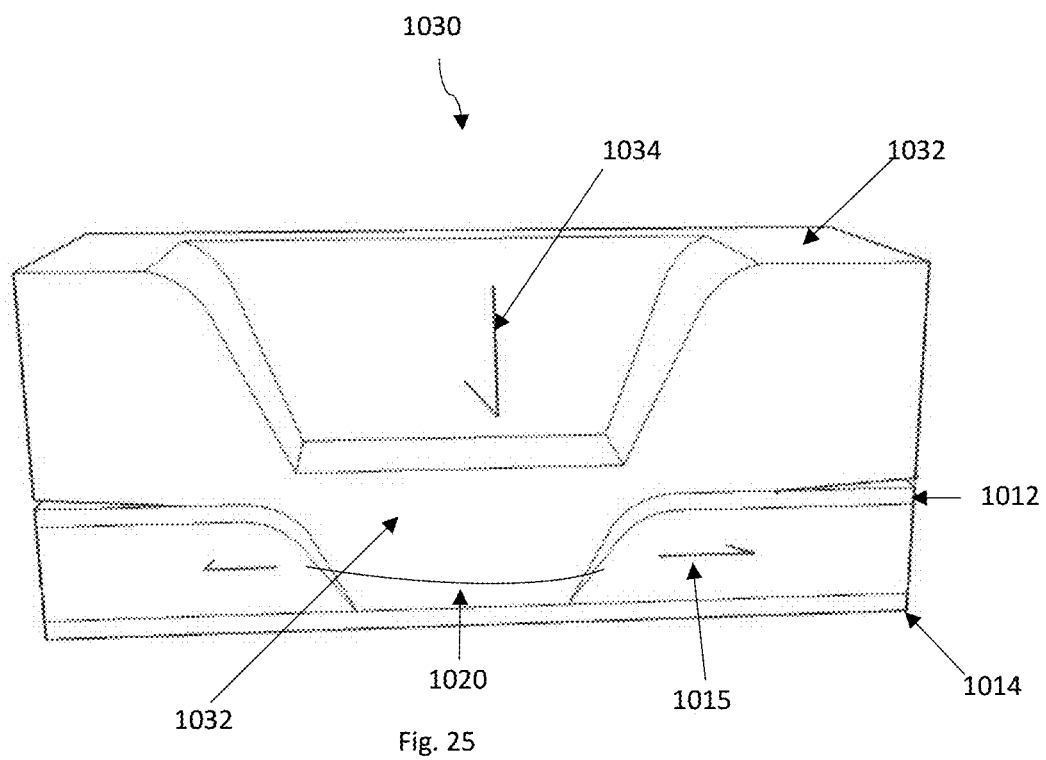
FIG. 25 depicts a side view of a composite current collector having a polymer substrate and two separate layers of metallized film with a weld-connected tab attached thereto.

FIG. 25 shows a welded composite 1030 of a tab 1032 and thin film current collector (1010 of FIG. 24) with a top metallized film 1012, polymer substrate 1015, and bottom metallized film 1014. As with FIG. 24, the top-applied weld 1020 moves the polymer substrate 1015 for the metallized films 1012, 1014 to contact. The tab 1032 likewise contacts with the top film 1012 in relation to the weld direction 1034 for connection between the tab 1032 and current collector (1010 of FIG. 24) allowing for conductivity from the bottom film 1014 through the top film 1012 to the tab 1032.

Figure 26:
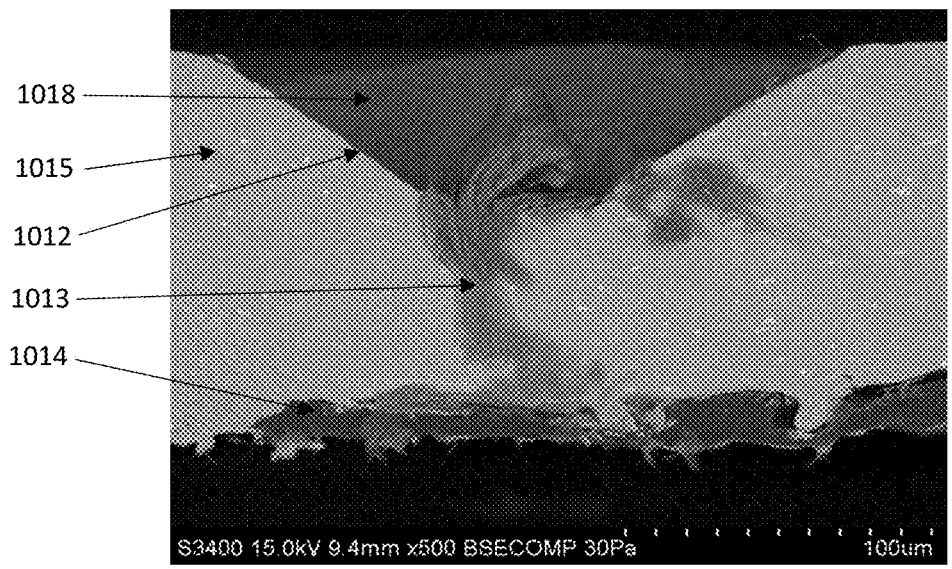
FIG. 26 is a high-magnification electron microscope cross-sectional view of a 100-micron length perspective of a welded current collector/polymer substrate composite (as in FIG. 25).
Figure 26A:
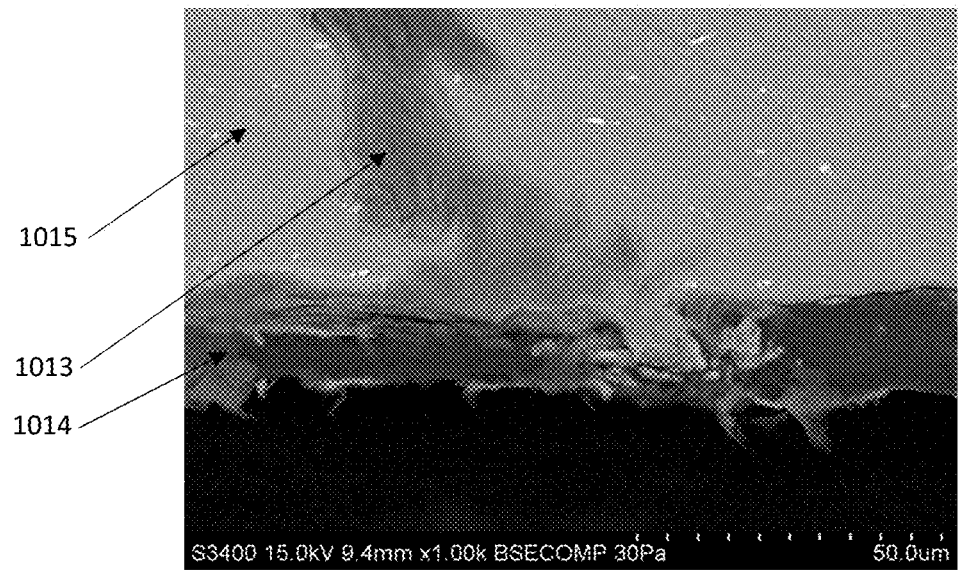
FIG. 26A is a 50-micron length perspective cross-sectional view of the composite of FIG. 26.

To show an actual potential embodiment in actual structural definition, FIGS. 26 and 26A show microphotographs (100- and 50-micron lengths, respectively) of weld interfaces of such a composite of metallized film 1012, polymer substrate 1015 and bottom film 1014. The weld direction 1018 presses the metallized film 1012 to and bottom film 1014 in such a manner as to produce a connection between the two materials 1013 through the polymer substrate 1015. This connection 1013 permits percolation between the top film 1012 and bottom film 1014 to facilitate and optimize the conductivity from the metallized film 1012 to a tab ((1042 in FIG. 27, for example) for improved battery operation.

Figure 27:
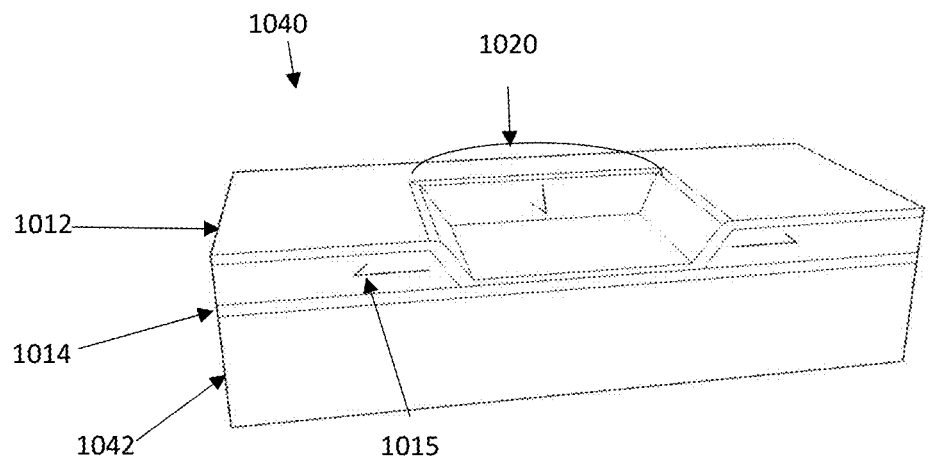
FIG. 27 depicts a side perspective view of a composite current collector having a polymer substrate and two separate layers of metallized film with a welded tab attached thereto.
Figure 27A:
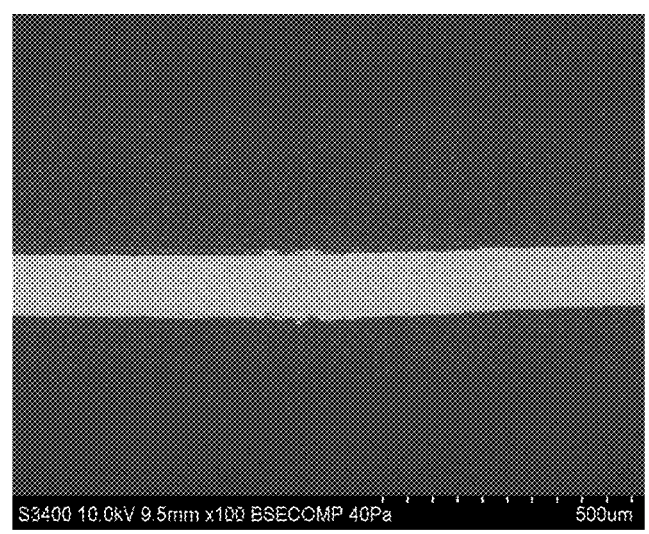
FIG. 27A is a high-magnification electron microscope cross-sectional view of a 500-micron portion of the interface between the metallized film, polymer substrate, and tab as shown at the weld location in FIG. 27.
Figure 27B:
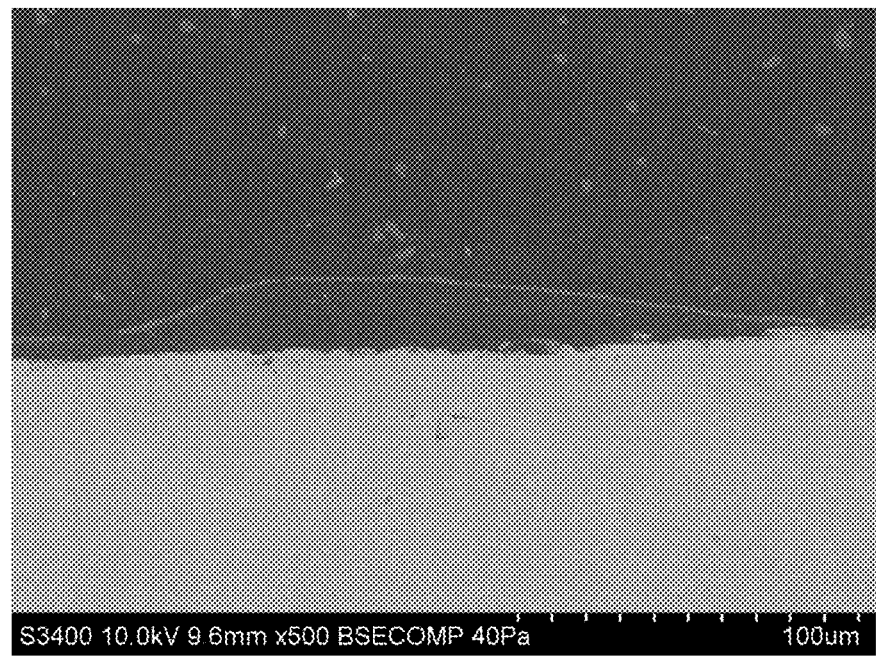
FIG. 27B is a 100-micron portion of the interface of FIG. 27A.
Figure 28:
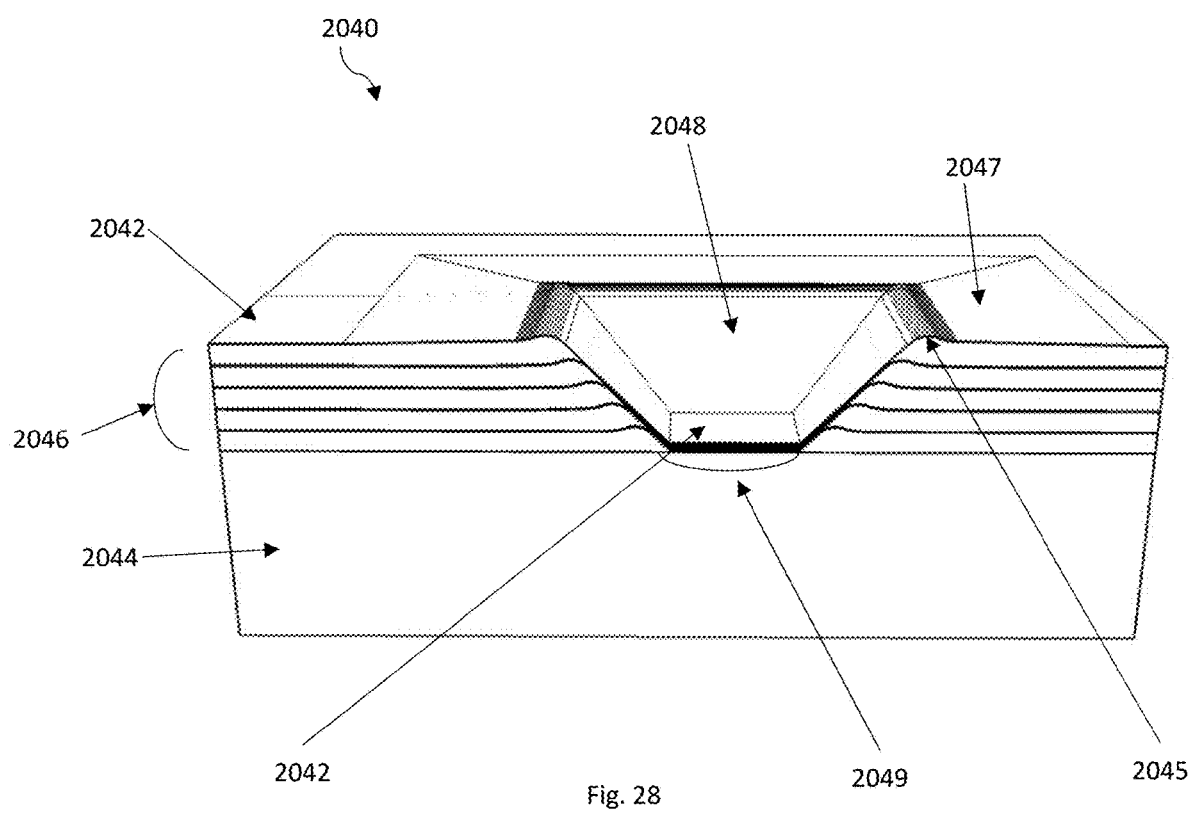
FIG. 28 depicts a side perspective view of a composite current collector having a polymer substrate and multiple layers of metallized film with a welded tab attached thereto.
Figure 28A:
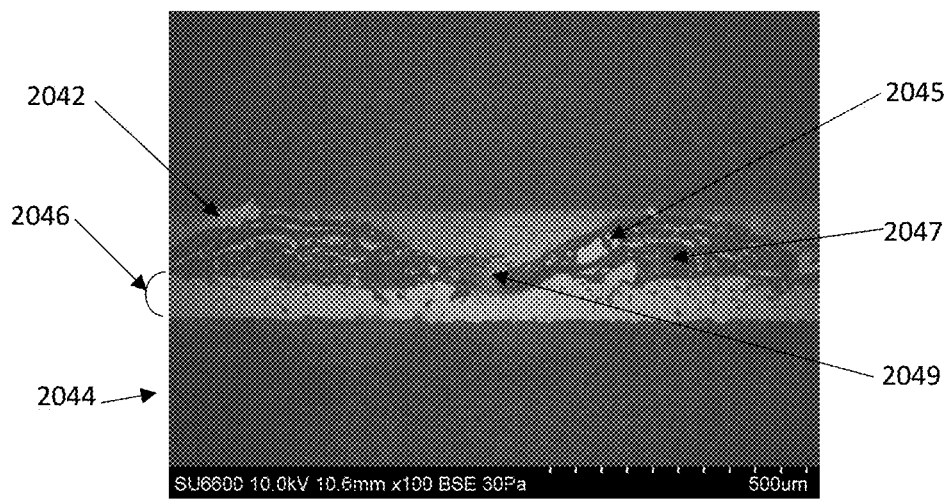
FIG. 28A is a high-magnification electron microscope cross-sectional view of a 500 micron length perspective of the welded multi-layered metallized film/polymer substrate composite as shown in FIG. 28.
Figure 28B:
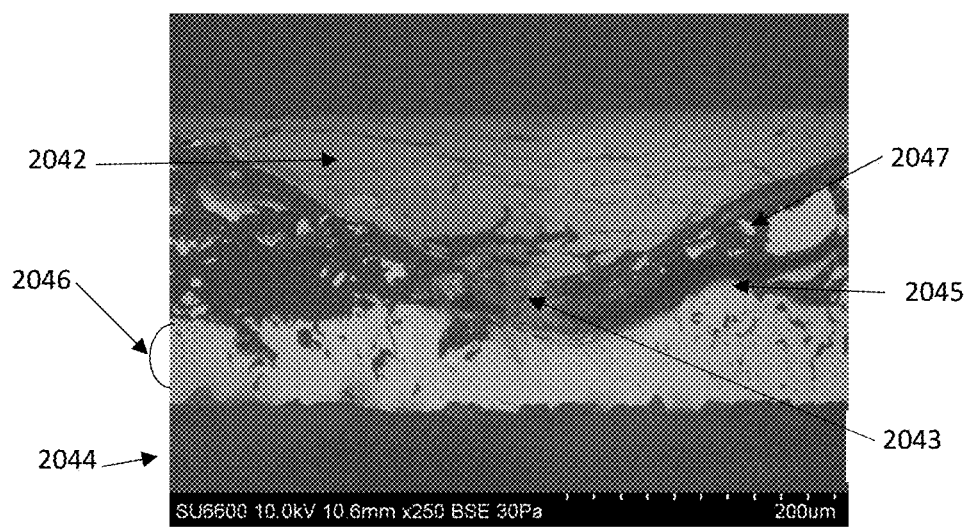
FIG. 28B is a 200-micron length perspective view of the composite of FIG. 28A.

FIG. 27 shows a tab/current collector composite 1040 with the same current collector as in FIG. 24 (1010) and a tab 1042 connected with the bottom film layer 1014. With the top weld 1020 applied to the current collector top film 1012, the polymer substrate 1015 is moved to allow for the top 1012 and bottom 1014 films to interface, thus permitted conductivity between the metallized films 1012, 1014 and the tab 1042. FIGS. 27A and 27B show photomicrographs of the interface of the weld interface between the bottom film and the tab, showing the clear delineations therein. FIG. 27B particularly shows the tab and bottom film welded layer interface with metallic debris present from the metallized filmi during the weld process. FIG. 28 shows a tab/current collector composite 2040 with a similar top thin film metallized film collector 2042 to the current collector as in FIG. 24 (1010) and a tab 2044 connected with a bottom film layer of a multi-layered metallized film structure 2046 (with polymer substrate in-between each individual layer). Such layers may be extruded to form such a multiple-layer structure 2046 on top of the tab 2044 itself. The layers 2046, including the top layer 2042, are of the same thin film structure as that in FIG. 24 (1010). The multiple layers 2042, 2046 manipulated through a weld divot 2048 to connect the multiple layers 2042, 2046 together at a weld interface 2049. Additionally, with the multiple thin film current collector layers 2042, 20436, the weld divot 2048 may be applied in such a manner as to generate a graduated contour 2047 surrounding the full weld divot 2048 to facilitate the full weld pressure application through the multiple current collector layers 2042, 2046. With such a contour 2047, there is further generated a raised peripheral edge 2045 at the top edge thereof the weld divot 2048. The resultant composite 2040 thus allows for conductivity between all of the metallized film collector layers 2042, 2046 to the tab 2044 for further utilization within a battery for external power transfer. FIGS. 28A and 28B provide photomicrographs of the same composite structure of FIG. 28. Noticeable are the top current collector layer 2042 and the multiple layers below 2046 of such thin film structures. The weld interface 2049 connects such multiple collector layers 2042, 2046 to the tab 2044. A visible contour 2047 surrounding the weld with a raised peripheral edge 2047 is also present. In FIG. 28B the weld interface 2049 shows the presence of film collector portions within the polymer substrate to allow for conductivity between not only the top thin film collector layer 2042 and the tab 2044, but also the multiple collector layers 2046 with the tab 2044. As above, such a composite 2040 allows for a battery transfer capability from a cell externally through such a tab 2044.

Figure 29:
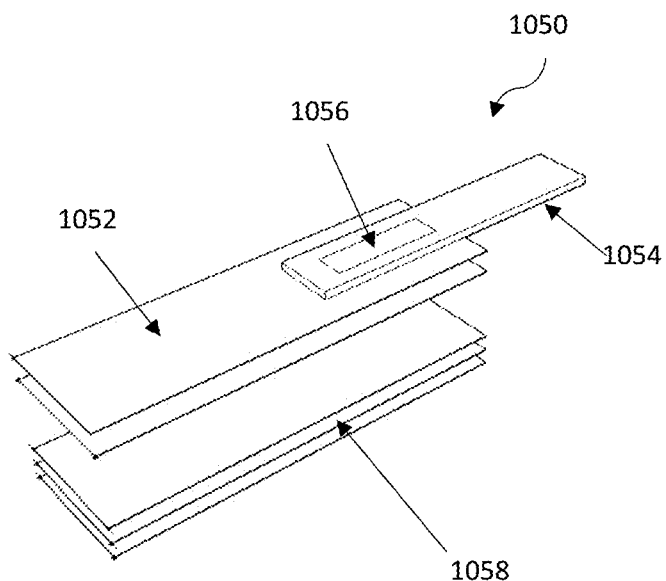
FIG. 29 depicts a side exploded perspective view of multi-layer of a metallized film current collector welded to a tab.

FIG. 29 provides a different possible composite 1050 of tab 1054, a top metallized film 1052 and multiple layers of metallized film current collectors 1058 connected to each other through a weld 1056, thus allowing for conductivity of such metallized films 1058, 1052 through to the tab 1054.

Figure 30:
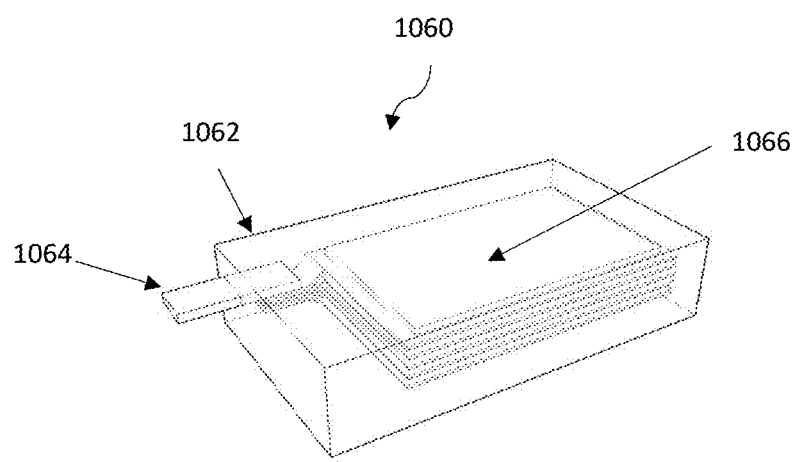
FIG. 30 depicts a transparent side perspective view of a rigid plastic enclosure battery including a metallized film current collector and welded tab composite.
Figure 31:
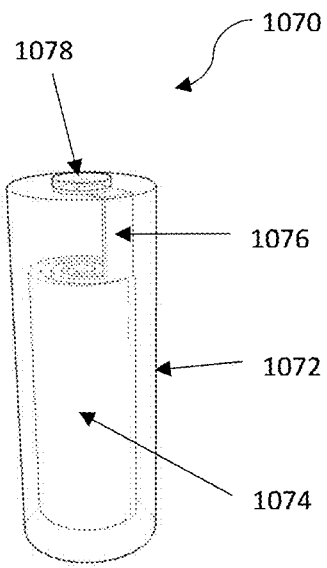
FIG. 31 depicts a side transparent view of a cylindrical battery with a jelly roll composite current collector with a welded tab.
Figure 32:
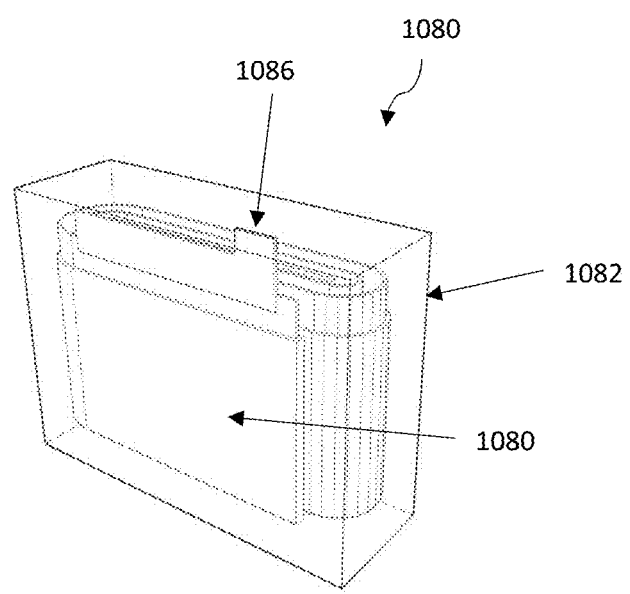
FIG. 32 depicts a side perspective transparent view of a pouch enclosure battery including a metallized film current collector and welded tab composite.

FIGS. 30, 31, and 32 show different types of battery devices utilizing the welded tab to a thin current collector power cell. FIG. 30 shows a battery 1060 with a rigid plastic container 1062, the power cell 1066 and the connected external tab 1064 for further connection to a device (not illustrated). FIG. 31 shows a cylindrical battery 1070 with a container 1072, power cell (electrode/current collector) 1074 and extending tab 1076. FIG. 32 shows a pouch battery 1080 with a pouch container 1082, a power cell 1084, and connected external tab 1086, again, for contact with an external device (not illustrated).

Figure 33:
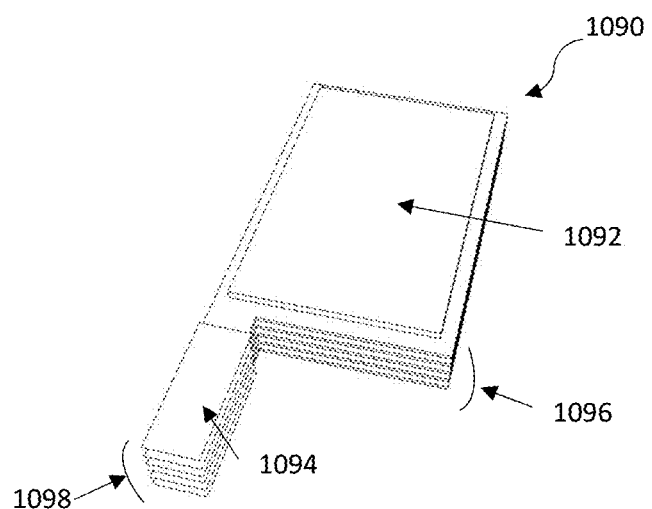
FIG. 33 depicts a front perspective view of a multi-layer battery composite with multi layers of metallized film current collectors and welded tabs.
Figure 33A:
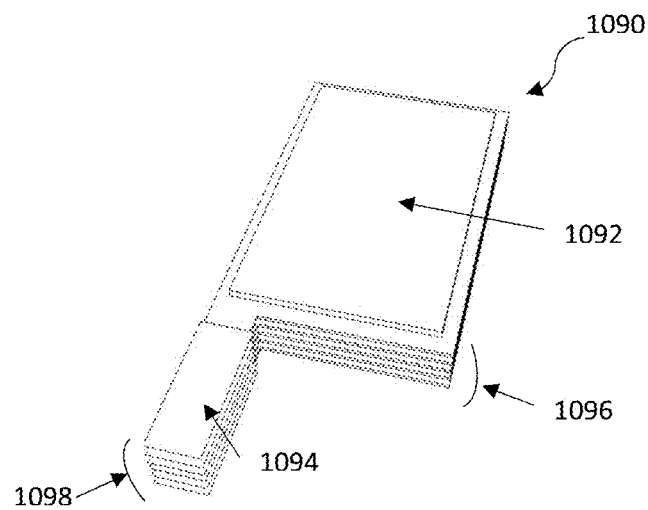
FIG. 33A is a different side perspective view of the battery composite of FIG. 33.

FIGS. 33 and 33A show power cell composites 1090 having multiple tabs 1098, multiple electrode/current collector layers 1096, a top tab 1094, and a top electrode current collector layer 1092, all welded together as described herein.

Figure 34:
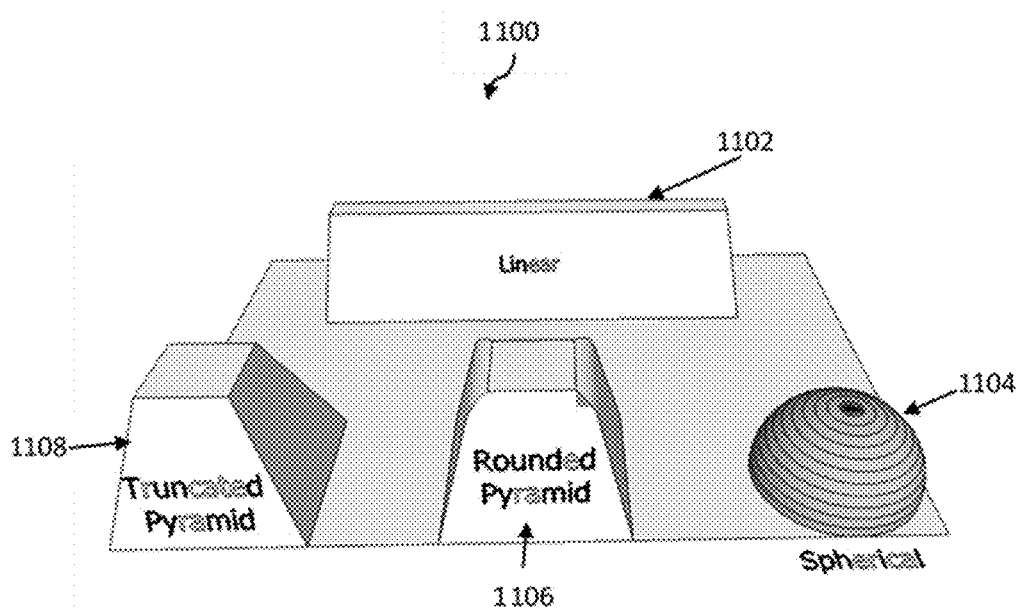
FIG. 34 depicts different potential embodiments of alternative weld structures in association with the metallized film current collectors and tabs herein.
Figures 35, 35A:
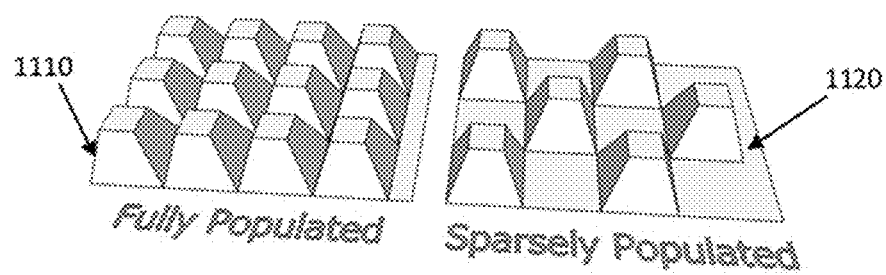
FIG. 35 depicts a possible embodiment configuration of a fully populated weld grid structure.
FIG. 35A depicts a possible embodiment configuration of a sparsely populated weld grid structure.
Figures 36, 37:
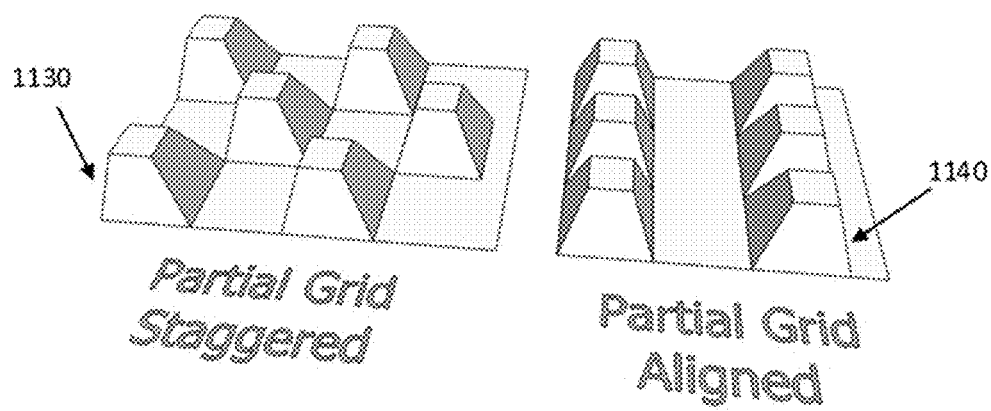
FIG. 36 depicts a possible embodiment configuration of a partial staggered weld grid structure.
FIG. 37 depicts a possible embodiment configuration of a partial aligned weld grid structure.

FIGS. 34, 35, 35A, 36, and 37 pertain to different potential embodiments of weld anvil structures and patterns/configurations for utilization within and imparting weld divot shapes and structures (three-dimensional) within target tab/power cell composites. FIG. 34 shows a number of different possible anvil structure embodiments 1100. One is a linear 1102 structure having a rectangular structure in three dimensions. Also shown is a truncated pyramid three-dimensional structure 1108 (with a narrowing slope from a square edge to a smaller square top), a rounded pyramid structure 1106, and a spherical structure 1104 (with ribbed peripheries). Such three dimensional anvils 1100 thus may be pressed with ultrasound, heat, or just pressure, within a composite current collector (1010 of FIG. 24) and/or collector and tab (1020 of FIG. 25) to impart the needed interfaces between current collector films and tabs. FIG. 35 thus shows one possible embodiment of repeating truncated pyramid structures 1110 in a full grid to apply welds in like pattern. FIG. 35A shows another possible embodiment of a grid of sparsely populated truncated pyramid anvils 1120 for the same purpose. FIGS. 36 and 37 relate to uniformity of grids of truncated pyramids 1130, 1140 for patterned application to target composites (staggered as compared with aligned). Such three-dimensional anvils thus allow for the manipulation of polymer substrates (1015 of FIG. 24, for instance) in relation to pressing a top film (1012 of FIG. 24) downward to contact with a bottom film (1014 of FIG. 24) in relation to a finished weld (1020 of FIG. 24) for connection and conductivity purposes, as discussed and described herein.

Figure 38:
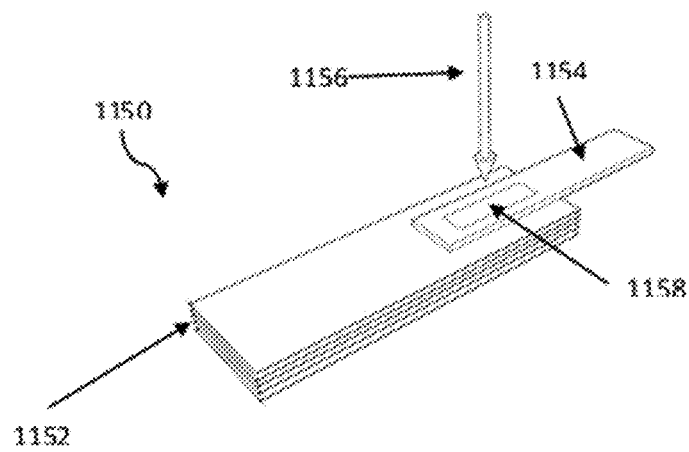
FIG. 38 depicts a side perspective view of a current collector and tab battery composite having a top-side weld present.
Figure 39:
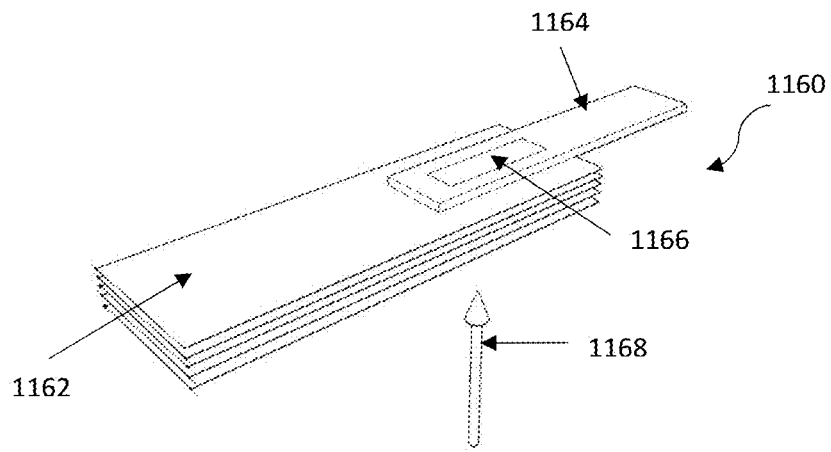
FIG. 39 depicts a side perspective view of a current collector and tab battery composite having a film-side weld present.

FIGS. 38 and 39 show different potential embodiments of a top weld (FIG. 38) and a bottom weld (FIG. 39). FIG. 38 shows a welded composite 1150 with a tab 1154, metallized film(s) 1152, a top weld direction 1154, and a finished weld 1156 connecting the metallized film(s) 1152 with the tab 1154. FIG. 39 shows a welded composite 1160 with a tab 1164m metallized film(s) 1162, a bottom weld direction 1164, and a finished weld 1166 connecting the metallized film(s) 1162 with the tab 1164.

Figure 40:
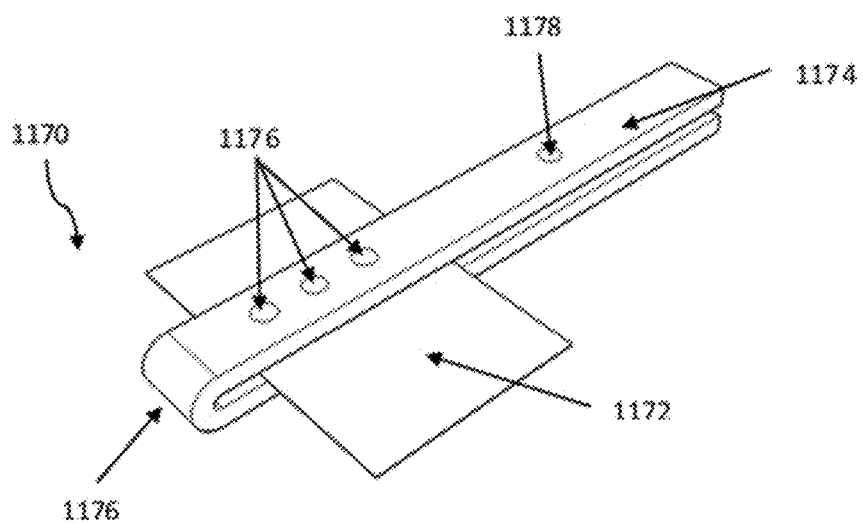
FIG. 40 depicts a side perspective view of a single folded welded tab and current collector composite.
Figure 41:
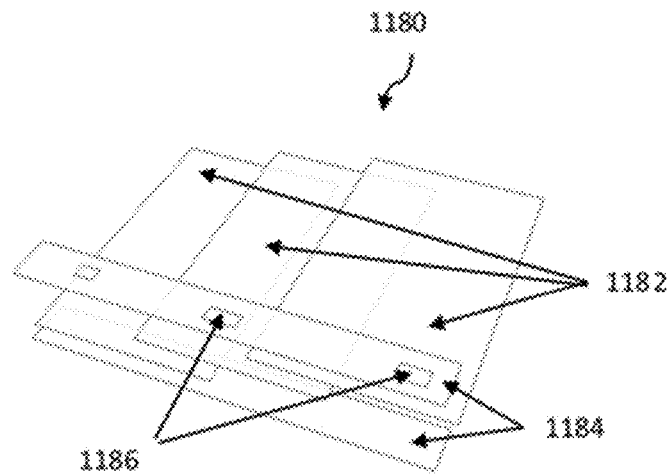
FIG. 41 depicts a partially exploded side perspective view of a multi-layer current collector and multi-tab composite.
Figure 42:
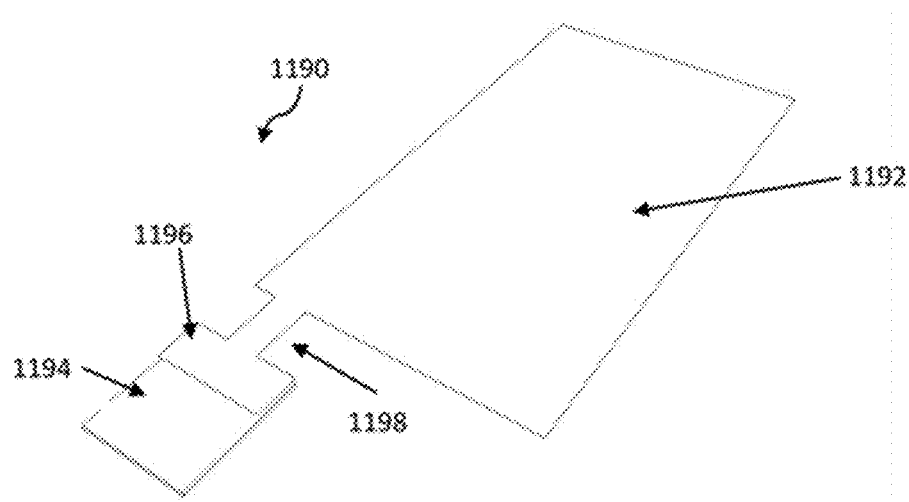
FIG. 42 depicts a side perspective view of a composite of an electrode and welded tab including a separating fuse structure.

FIG. 40 shows a possible embodiment of a welded composite 1170 with a single folded tab 1174 having a single bend 1175, a current collector/electrode 1172, multiple welds 1176 between the tab 1174 and the current collector/electrode 1172, and an end weld 1178 for the tab to attach to itself. FIG. 41 shows a possible embodiment of a welded composite 1180 of staggered metallized film current collectors 1182 and staggered tabs 1184 with multiple welds 1186 for attachment of such collectors 1182 and tabs 1184 together. In this configuration, each metal face of each current collector 1182 comes in face-to-face contact with at least one of the tabs 1184. FIG. 42 shows a possible embodiment of a welded composite 1190 with an electrode/current collector 1192 connected to a fuse area 1198 that is welded to a tab 1194 within a limited weld area 1196 at the fuse area 1198. These embodiments provide some showing of the versatility available in relation to such welding techniques with thin film current collectors.

Figure 43:
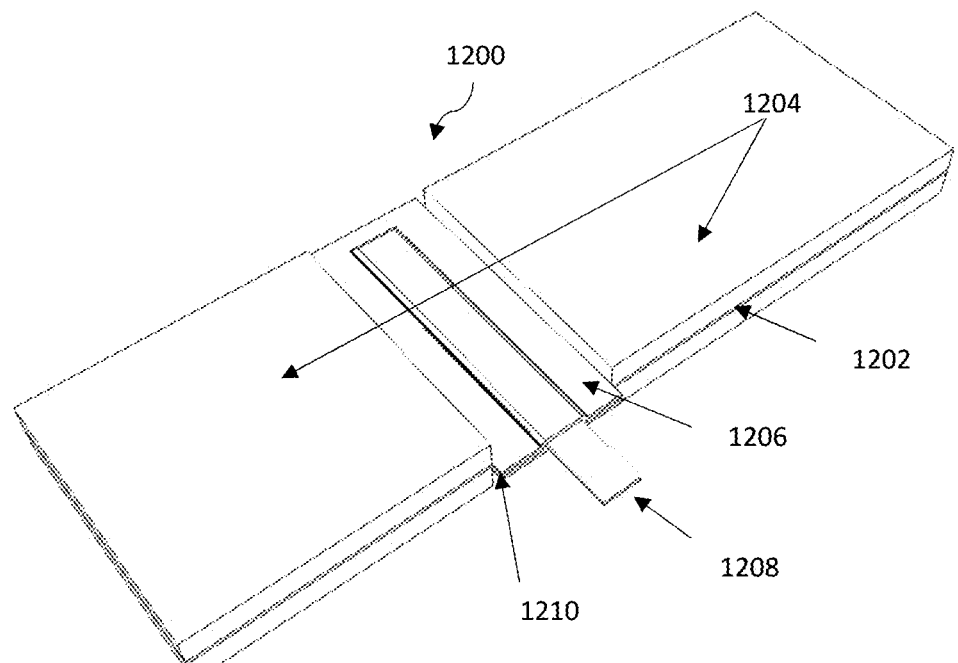
FIG. 43 depicts a side perspective view of a portion of a current collector/electrode/tab composite with tape for attachment.
Figure 44:
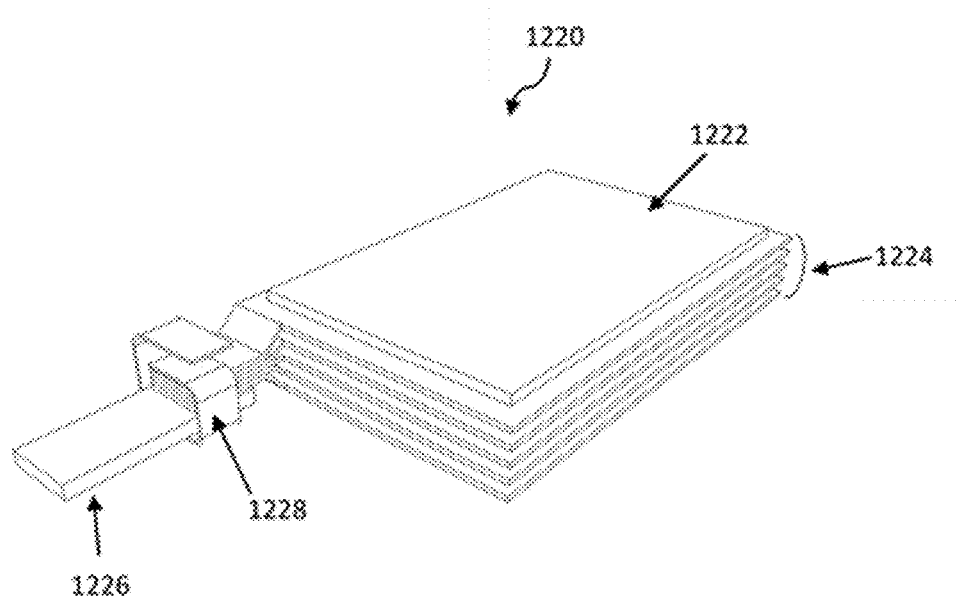
FIG. 44 depicts a side perspective view of a battery composite having multi-layer current collectors and electrodes and a wound tape connection for a welded tab.
Figure 45:
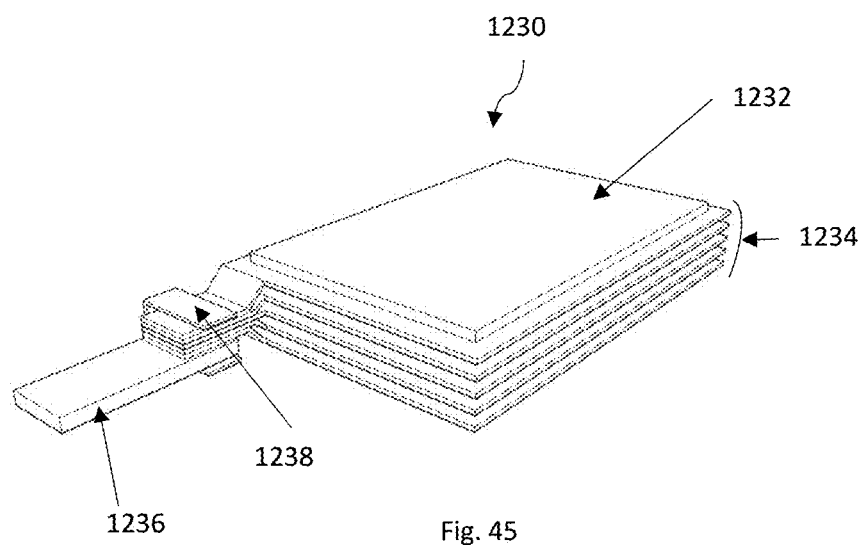
FIG. 45 depicts a side perspective view of a battery composite having multi-layer current collectors and electrodes and a clamped tape connection for a welded tab.

FIGS. 43, 44, and 45 provide depictions of possible embodiments in relation to reinforcements to supplement such welding operations within power cell composites. FIG. 43 shows a welded composite 1200 having opposing electrodes 1202, 1204 with a welded tab 1208, a reinforcement tape 1206, and a further overlap 1210 for such increased reinforcement capabilities. FIG. 44 shows a multi-film welded composite 1220 with multiple thin films 1224, a top layer thin film 1222, and a welded tab 1226. A reinforcement tape 1228 is applied at the tab weld (not shown) again to increase the applied pressure for reinforcement capability over such a weld area. FIG. 45 shows a multi-film welded composite 1230 having multiple thin films 1234, a top layer thin film 1232, and a welded tab 1236. Applied over a weld interface is a clamp 1238 to reinforce such weld(s) (not illustrated). Thus, reinforcement of such welds may be accomplished through a number of different possible alternatives.

With such unique and heretofore unexplored welds, patterns thereof, different weld types themselves, even reinforcements for increased safety, reliability, and effectiveness, there is provided a novel approach to utilizing thin metallized film current collectors within lithium ion (and like) batteries, capacitors, power cells, etc., for effective power transfer and reduced thermal runaway potential.

Having described the invention in detail it is obvious that one skilled in the art will be able to make variations and modifications thereto without departing from the scope of the present invention. Accordingly, the scope of the present invention should be determined only by the claims appended hereto.

What is claimed is:

1. A process to produce a lithium ion battery comprising the steps of:
   a. providing an electrode having at least one metallized substrate with a coating of an ion storage material and a separate polymer substrate layer;
   b. providing a counterelectrode;
   c. layering said electrode and counterelectrode opposite each other with a separator component interposed between said electrode and said counterelectrode;
   d. providing a package material including an electrical contact component, wherein said contact includes a portion present internally within said package material and a portion present external to said package material;
   e. electrically connecting said electrical contact component with said metallized substrate wherein at least one metal layer of said metallized substrate is pressed through said polymer substrate layer of said metallized substrate to make an electrical connection with resistance less than 1 ohm with said electrical contact;
   f. introducing at least one liquid electrolyte with ions internally within said package material; and
   g. sealing said package material.

2. The method of claim 1 wherein said lithium battery further comprises an anode, a cathode, at least one separator present between said anode and said cathode, and at least one tab attached to said metallized substrate through said electrical connection of step "e".

3. The method of claim 2 wherein said metallized substrate is at least one thin film current collector.

4. The method of claim 3 wherein said polymer substrate layer of said metallized substrate has a polymer substrate layer having a top and bottom surface, wherein a first metallized layer is attached to said polymer substrate top layer and a second metallized layer is attached to said polymer substrate bottom layer, wherein a tab is placed on said polymer substrate bottom layer, and wherein said at least one thin film current collector exhibits at least one weld divot therein such that at least a portion of said first metallized layer is in contact with said tab.

5. The method of claim 4 wherein said lithium ion battery further comprises at least one electrical connection tab attached through said at least one weld divot to at least one of said first metallized layer and said second metallized layer.

6. The method of claim 5, wherein said at least one weld divot associates with one of said anode and said cathode.

7. The method of claim 6, wherein at least one electrical connection tab is electrically connected through said at least one weld divot to said anode or said cathode.

8. The method of claim 1, wherein said at least one metallized substrate includes up to 25 metallized film layers thereof.

9. The method of claim 2, wherein up to 25 electronic connection tabs are present.

10. The method of claim 1, wherein reinforcements are provided over said at least one weld divot.

11. The method of claim 8, wherein a plurality of metallized thin film current collectors are present and at least a plurality of said up to 25 metallized film layers present within said plurality of metallized substrates are extruded through adjacent metallized substrates to contact metallized film layers of other metallized substrates that are otherwise not in face-to-face contact with said extruded metallized film layers.

12. The method of claim 7 wherein a plurality of weld divots are present which exhibit a pattern that is fully populated, sparsely populated, partial grid staggered or partial grid aligned.

13. The method of claim 12 wherein at least one of said plurality of weld divots exhibits a shape selected from linear, a truncated pyramid, rounded pyramid and spherical.

14. The method of claim 8 wherein a plurality of weld divots is present which exhibit a pattern that is fully populated, sparsely populated, partial grid staggered or partial grid aligned.

15. The method of claim 14 wherein at least one of said plurality of weld divots exhibits a shape selected from linear, a truncated pyramid, rounded pyramid and spherical.

* * * * *